(12) United States Patent
Saggar et al.

(10) Patent No.: US 12,193,014 B2
(45) Date of Patent: Jan. 7, 2025

(54) SWITCHING PUCCH PARAMETERS IN RESPONSE TO CHANNEL CONDITIONS

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/454,882

(22) Filed: Nov. 15, 2021

(65) Prior Publication Data
US 2023/0156715 A1    May 18, 2023

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC . H04W 24/02; H04W 72/04; H04W 72/1289; H04W 72/1268; H04W 72/046; H04W 72/042; H04L 5/00; H02J 50/00
See application file for complete search history.

(56) References Cited

U.S. PATENT DOCUMENTS

| 2020/0092685 A1* | 3/2020 | Fehrenbach | H04W 84/047 |
| 2020/0275413 A1* | 8/2020 | Zhang | H04W 72/51 |
| 2022/0264323 A1* | 8/2022 | Yang | H04L 5/0051 |

\* cited by examiner

*Primary Examiner* — Iqbal Zaidi
(74) *Attorney, Agent, or Firm* — Procopio, Cory, Hargreaves & Savitch LLP

(57) ABSTRACT

Method and apparatus to updated PUCCH parameters in response to channel conditions. The apparatus transmits, to a UE, a configuration to update one or more PUCCH parameters. The apparatus identifies a change of channel conditions between the UE and the base station. The apparatus transmits, to the UE, an indication to update the one or more PUCCH parameters based at least on the change of the channel conditions. The apparatus communicates, with the UE, based on a PUCCH having the one or more PUCCH parameters updated.

27 Claims, 19 Drawing Sheets

SWITCHING PUCCH PARAMETERS IN RESPONSE TO CHANNEL CONDITIONS

TECHNICAL FIELD

The present disclosure relates generally to communication systems, and more particularly, to a configuration to update physical uplink control channel (PUCCH) parameters in response to channel conditions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a configuration to update one or more physical uplink control channel (PUCCH) parameters. The apparatus identifies a change of channel conditions between the UE and the base station. The apparatus transmits, to the UE, an indication to update the one or more PUCCH parameters based at least on the change of the channel conditions. The apparatus communicates, with the UE, based on a PUCCH having the one or more PUCCH parameters updated.

In an aspect of the disclosure, a method, a computer-readable medium, and an apparatus are provided. The apparatus may be a device at a UE. The device may be a processor and/or a modem at a UE or the UE itself. The apparatus receives, from a base station, a configuration to update one or more physical uplink control channel (PUCCH) parameters. The apparatus receives, from the base station, an indication to update the one or more PUCCH parameters based at least on a change of channel conditions. The apparatus communicates, with the base station, based on a PUCCH having the one or more PUCCH parameters updated.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
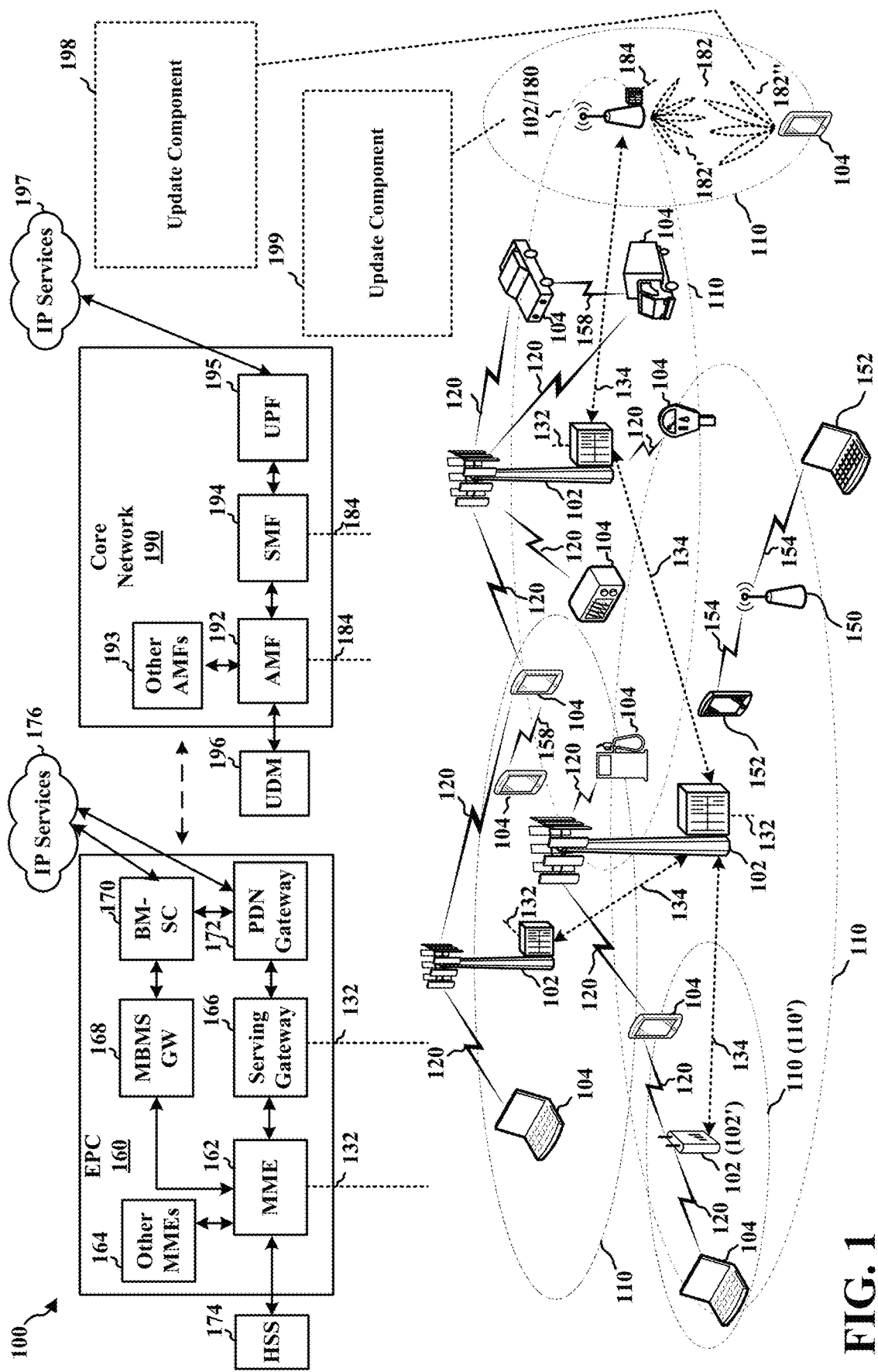
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to receive an indication to update one or more PUCCH parameters based on channel conditions. For example, the UE 104 may comprise an update component 198 configured to receive an indication to update one or more PUCCH parameters based on channel conditions. The UE 104 may receive, from a base station 180, a configuration to update one or more PUCCH parameters. The UE 104 may receive, from the base station 180, an indication to update the one or more PUCCH parameters based at least on a change of channel conditions. The UE 104 may communicate, with the base station 180, based on a PUCCH having the one or more PUCCH parameters updated.

Referring again to FIG. 1, in certain aspects, the base station 180 may be configured to update one or more PUCCH parameters based on channel conditions. For example, the base station 180 may comprise an update component 199 configured to update one or more PUCCH parameters based on channel conditions. The base station 180 may transmit, to a UE 104, a configuration to update one or more PUCCH parameters. The base station 180 may identify a change of channel conditions between the UE 104 and the base station 180. The base station 180 may transmit, to the UE 104, an indication to update the one or more PUCCH parameters based at least on the change of the channel conditions. The base station 180 may communicate, with the UE 104, based on a PUCCH having the one or more PUCCH parameters updated.

Although the following description may be focused on 5G NR, the concepts described herein may be applicable to other similar areas, such as LTE, LTE-A, CDMA, GSM, and other wireless technologies.

Figure 2:
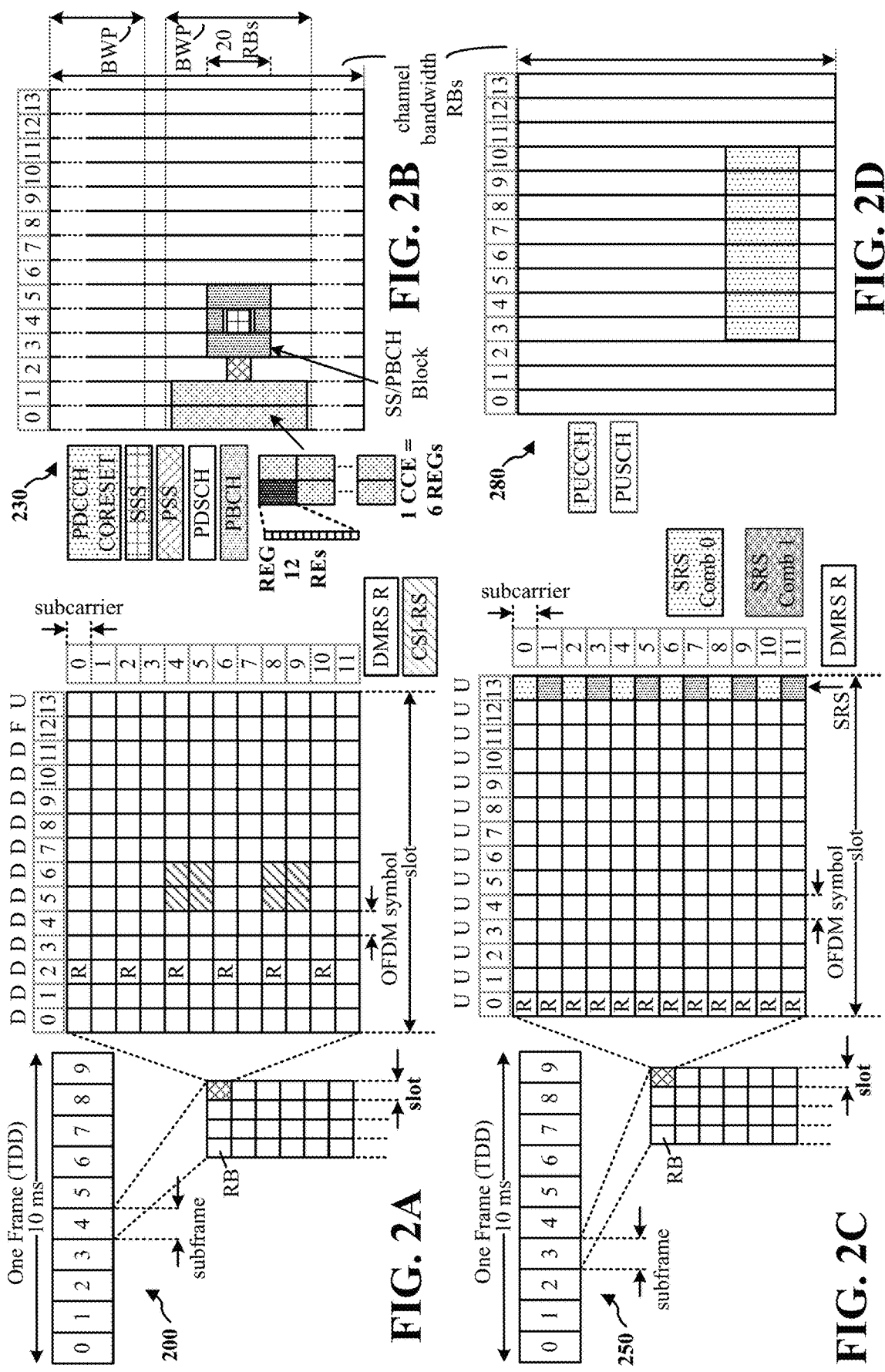
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
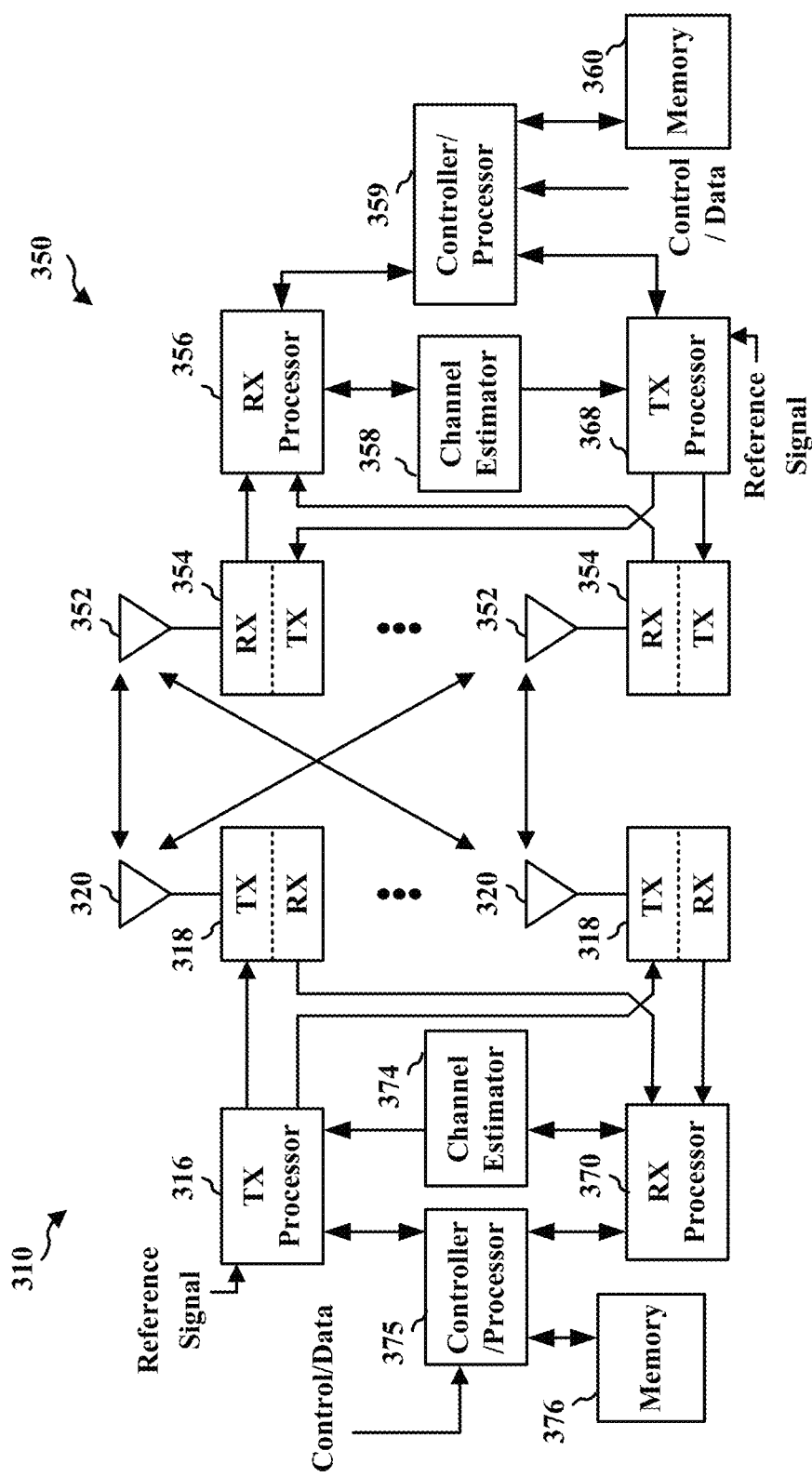
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

In wireless communication systems, PUCCH may be designed to support waveforms at higher frequency bands of frequency range 4 (FR4) (e.g., 70 GHz-114 GHz), as well as for frequency range 5 (FR5) (e.g., greater than 114 GHz). The waveform should have a low peak to average power ratio (PAPR), a reduced or lower complexity than OFDM, and should be robust to phase noise. Potential contenders for the waveform may include single carrier quadrature amplitude modulation (QAM) and discreet Fourier transform (DFT) spread OFDM (DFT-s-OFDM).

PUCCH may comprise either coherent PUCCH with demodulation reference signal (DMRS) or non-coherent PUCCH without DMRS. A PUCCH format may be chosen by the base station and may be configured via RRC signaling. There is no adaptation as channel conditions change. Non-coherent PUCCH may perform better than coherent PUCCH in some instances, such as in low signal to interference plus noise ratio (SINR) when channel estimation with DMRS incurs a high loss or in instances of small amounts of data transmission. A non-coherent PUCCH of format 0 may not be flexible enough to adapt its indication parameters to data demands of the UE or to SINR changes. For example, in instances where it is 1 RB and only 1-2 symbols, it may not be possible to get more or less resources to support the data demands of the UE. In another example, such as in instances where the PUCCH uses a fixed computer generated sequence of size 12, which may not be optimal at all SINRs. In yet another example, if the PUCCH uses only 8 cyclic shifts to indicate information (e.g., limited to 3 bits), may not be able to exploit channel conditions to send more bits via non-orthogonal ways.

Aspects presented herein provide a configuration to update PUCCH parameters in certain instances. For example, the PUCCH may adapt the signaling capability in terms of the amount of bits signaled, a sequence used to signal the information, or the modes on which information may be encoded. In some instances, the PUCCH parameters may be updated based at least one changes in channel condition (e.g., SINR, RSSI), data needs of the UE (e.g., amount of bits to be signaled), or a change in the coding requirement of the UE. At least one advantage of the disclosure is that dynamic switching of PUCCH parameters may be performed via DCI or MAC-CE which may be faster than via RRC reconfiguration. At least another advantage of the disclosure is an enhanced spectral efficiency, better use of the channel condition, and increased robustness from PUCCH.

Figure 4:
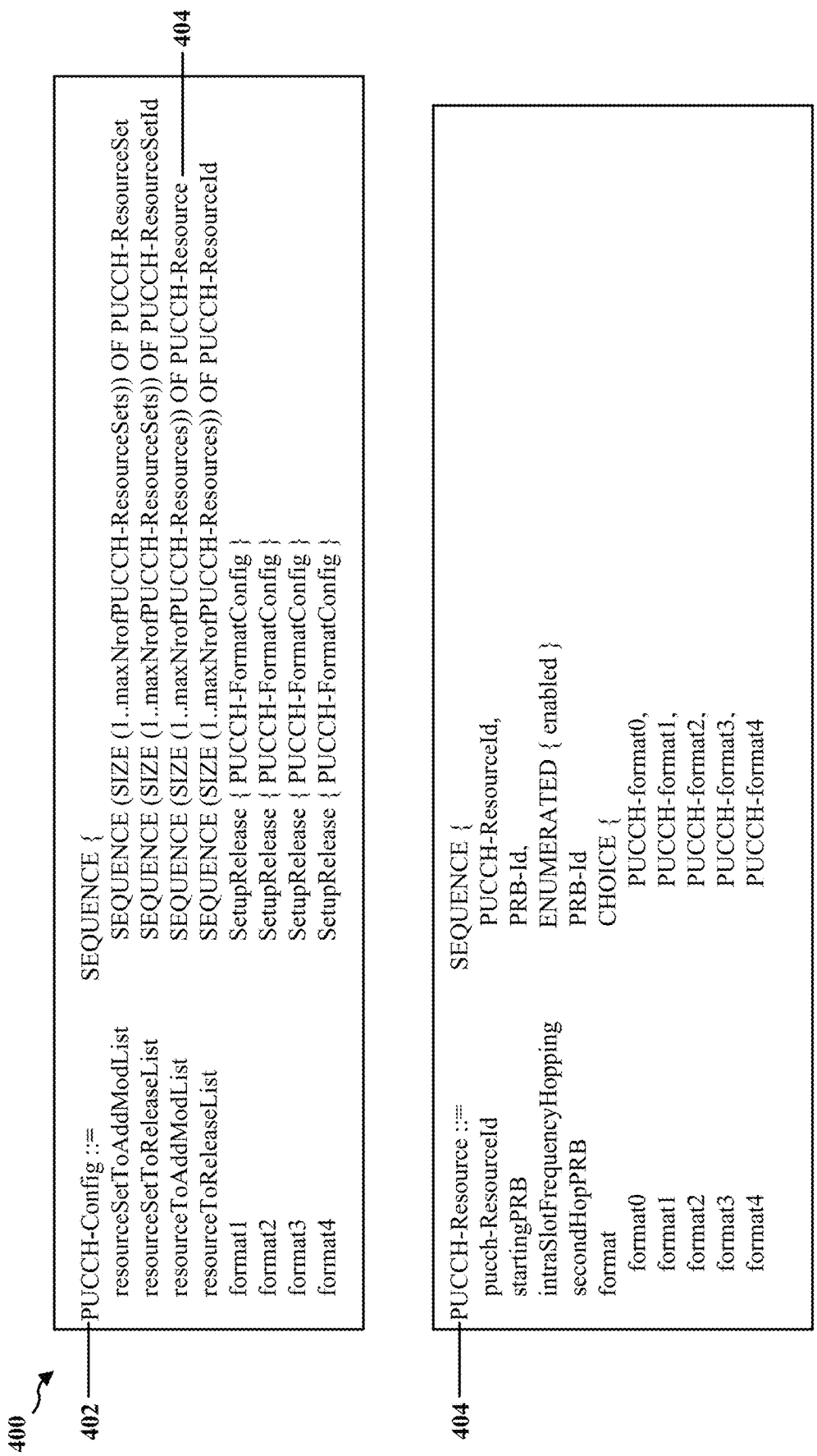
FIG. 4 is a diagram illustrating an example of a PUCCH configuration.
Figure 5:
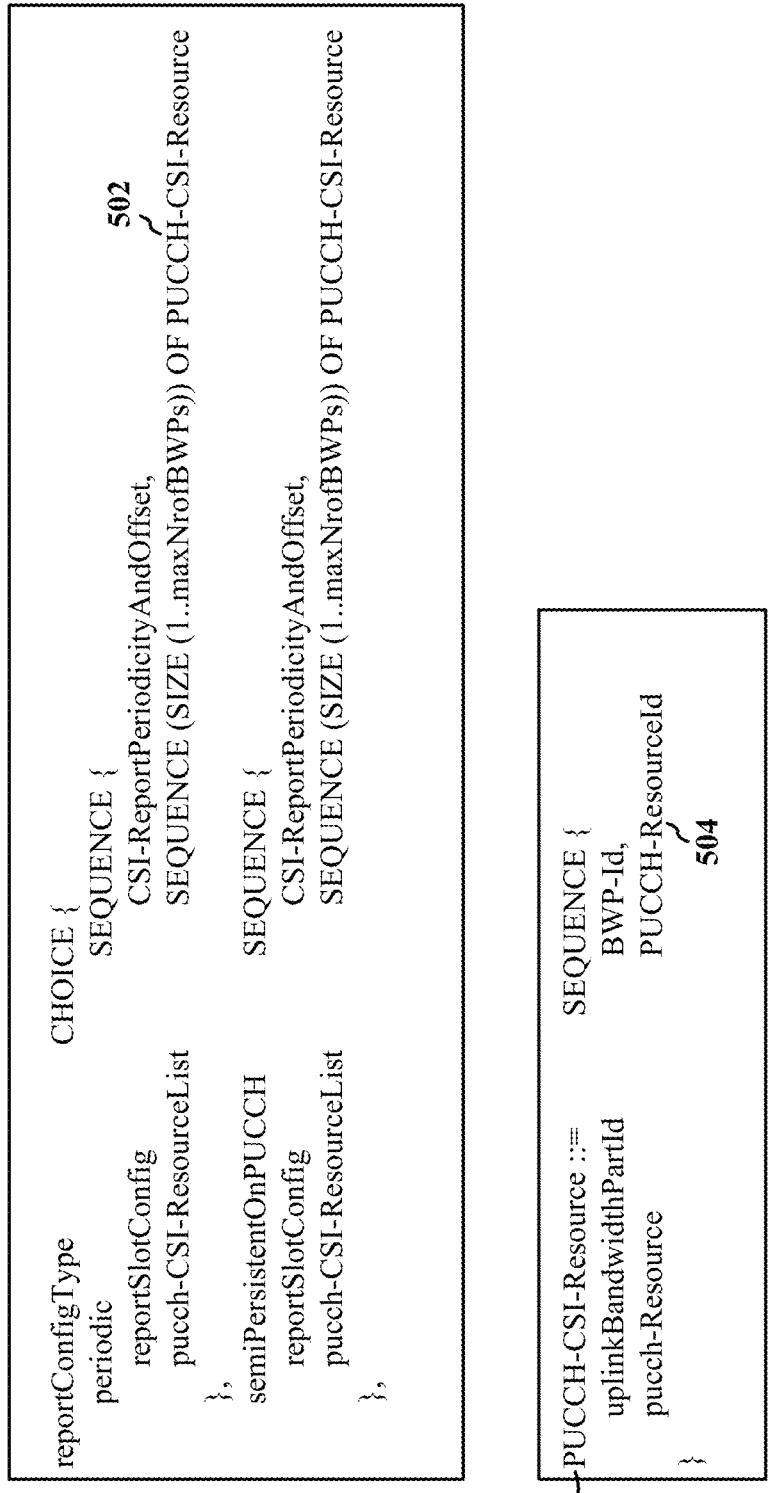
FIG. 5 is a diagram illustrating an example of a CQI reporting resource.

FIG. 4 is a diagram 400 of PUCCH configuration. PUCCH may be configured via RRC. PUCCH adaptation to SNR may be performed via an RRC reconfiguration. PUCCH parameters may be defined in the information element PUCCH-Config 402 in RRC. The PUCCH-Config 402 may refer to PUCCH-Resource 404 to define the PUCCH parameters. In some instances, a CQI report may be tied to the PUCCH resource through RRC. As such, changing the CQI reporting may be performed via RRC reconfiguration. For example, with reference to diagram 500 of FIG. 5, the PUCCH-CSI-Resource 502 includes reference to the PUCCH-ResourceId 504.

Figure 6:
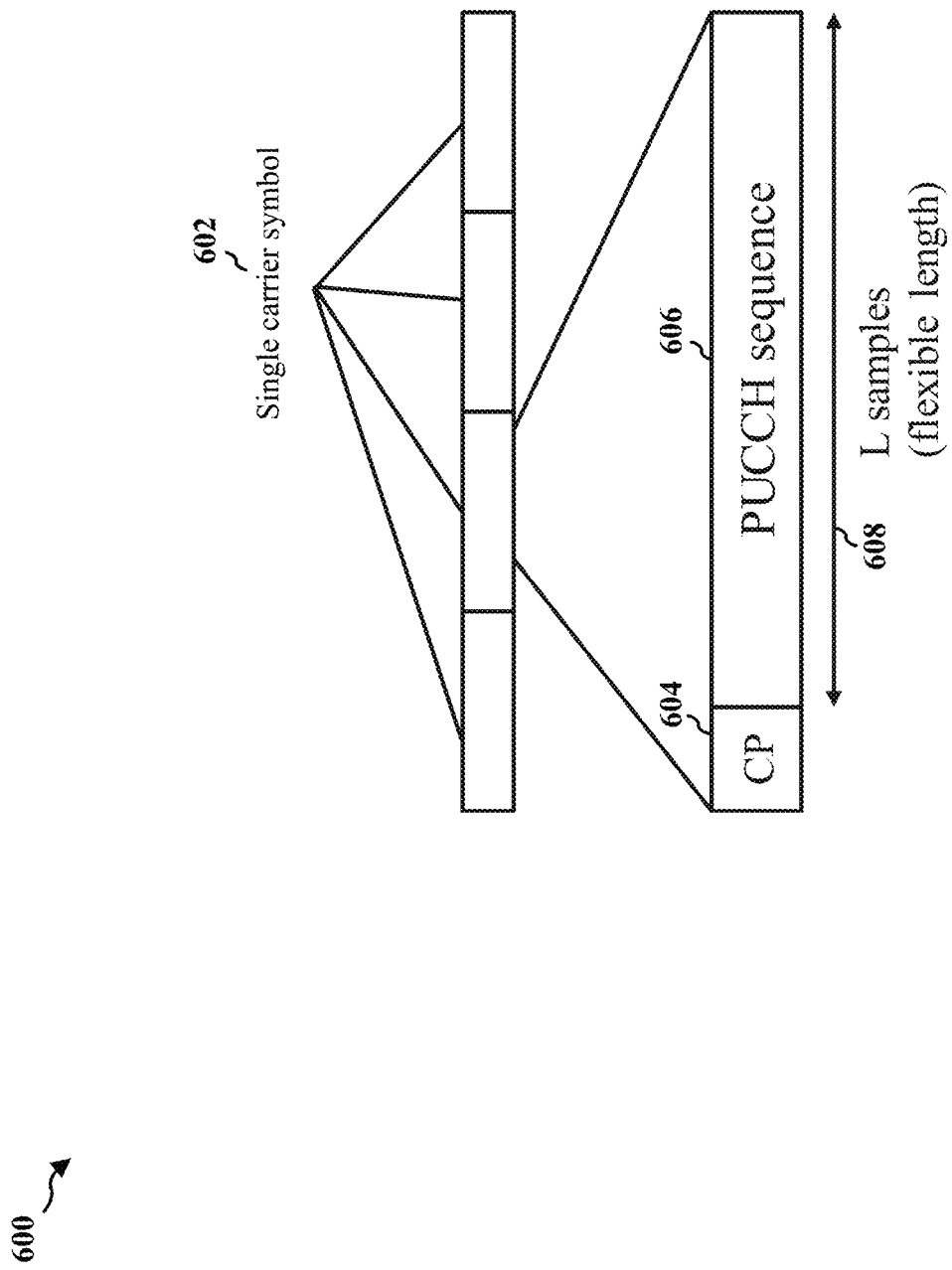
FIG. 6 is a diagram illustrating an example of a single carrier symbol.

In some instances, the PUCCH parameters to use may be indicated dynamically. For example, PUCCH parameters may be changed in response to channel conditions, the amount of bits to be transmitted by the UE, or coding requirement of the UE. This change may be done dynamically and without RRC reconfiguration. The changed PUCCH parameters may comprise one or more of the signaling capacity of a PUCCH format, the manner in which information is encoded in PUCCH, the type of PUCCH format (e.g., coherent or non-coherent), or other parameters of a PUCCH format. With reference to diagram 600 of FIG. 6, a single carrier symbol 602 may comprise a cyclic prefix (CP) 604 and a PUCCH sequence 606 that may be comprised of L samples 608.

In some instances, the network, via a base station, may indicate a change in PUCCH parameters via DCI or MAC-CE. PUCCH resources may still be configured via RRC, but DCI or MAC-CE may allow for dynamic changing of the PUCCH parameters as needed. In some instances, the PUCCH parameters that may be updated via DCI or MAC-CE may comprise an addition to an existing PUCCH resource, overwriting one or more fields in an existing PUCCH resource, or selecting from among a set of preconfigured PUCCH resources. The addition to the existing PUCCH resource may comprise the allowed shifts of the sequence used in PUCCH to be added via DCI or MAC-CE, while other transmission parameters may be configured via RRC. The overwriting of one or more fields in the existing PUCCH resource may comprise that the type of sequence to be used may be changed from DFT to Zadoff Chu based on the SINR conditions. The selection of a set of preconfigured PUCCH resources may comprise different kinds of PUCCH formats with different parameters that are appropriate for different conditions. The network may select the resource which may be the best or appropriate for a given scenario. The network may configure resources with similar PUCCH resources but having different time-frequency resources for transmission. This may allow the network to dynamically switch where PUCCH may be transmitted based on an observed SINR.

In some instances, the choice of sequence used for PUCCH (e.g., non-coherent) and how the sequence is generated may be changed dynamically in response to channel conditions, the amount of bits to be transmitted by a UE, or a coding requirement of the UE. For example, the choice of the sequence may be adaptable. The sequence may be one of a DFT or Zadoff Chu sequence. A cross-correlation between different root Zadoff Chu sequences may be 1/lN whereas between DFT sequences may be 0. Thus, the root Zadoff Chu sequences may require a higher SINR than a DFT sequence to achieve the same detection performance. In addition, the sequence may be generated via sampling a larger sequence. For example, a sampled DFT sequence of length 168 may be generated by sampling a 4096 length DFT sequence. The sampling may help reduce the transmitted sequence length and the resources used. The choice of the sampling function may affect performance such that the sampling function used may also be adaptable to the channel. The sampling function may comprise at least one of linear sampling, quadratic sampling, cubic sampling, or the like. The sampling factor may correspond to the ratio of the original sequence length to sampled sequence length which may affect performance. The sampling factor may also be adaptable to the channel. For example, at a high signal to noise ratio (SNR), a sampling factor of 4096/168 may be feasible, but a low SINR may have a limit to 512/168.

In adapting the PUCCH sequence, there may be a tradeoff between signaling capability and SINR of operation among PUCCH sequences. For example, the amount of bits that may be transmitted using two kinds of sequences using different modes and the signal versus interference level at which they operate. Table 1 shows SINR and signaling capability tradeoff of example PUCCH sequences.

TABLE 1

| Sequence Used | Modes of signaling information | Number of bits signaled for sequence length L with cyclic prefix length CP | Interference from other sequences |
| --- | --- | --- | --- |
| DFT | DFT index | $\log_2(L)$ | 0 |
| Zadoff Chu | Zadoff Chu Root | $\log_2(L)$ | $1/\sqrt{L}$ |
| Zadoff Chu | Zadoff Chu Root and cyclic shift | $\log_2(L) + \log_2(L/CP)$ | $1/\sqrt{L}$ |

A higher signaling capability may be obtained by varying the PUCCH sequence, but may require operating under more interferences which may limit the SINR resources.

In some instances, sampling a sequence may reduce the length of the transmitted sequence while still conveying a similar number of bits as the original sequence but at the cost of interference. Many sampling functions may be possible, and may be optimized to the sequence and sampling factor. For example, in a M×M DFT matrix, a M×L sampled DFT matrix may be derived by selecting indices given by the sampling function $f(n)$, as shown in Matrix 1.

$$A = \begin{bmatrix} a_{11} & a_{12} & \cdots & a_{1M} \\ a_{21} & a_{22} & \cdots & a_{2M} \\ \cdots & \cdots & \cdots & \cdots \\ a_{M1} & a_{M2} & \cdots & a_{MM} \end{bmatrix} \quad \text{Matrix 1}$$

In Matrix 1, the columns selected may be given by $f(n)$ for n=1 to L, which may result in M sequences corresponding to M rows, where each sequence may have L samples corresponding to the selected indices $f(n)$. A quadratic sampling function may be in the form $$f(n) = \mathrm{mod}\left(a * \frac{n(n+b)}{2} + c, M\right) + 1$$

for some constants a, b, c.

Figure 7:
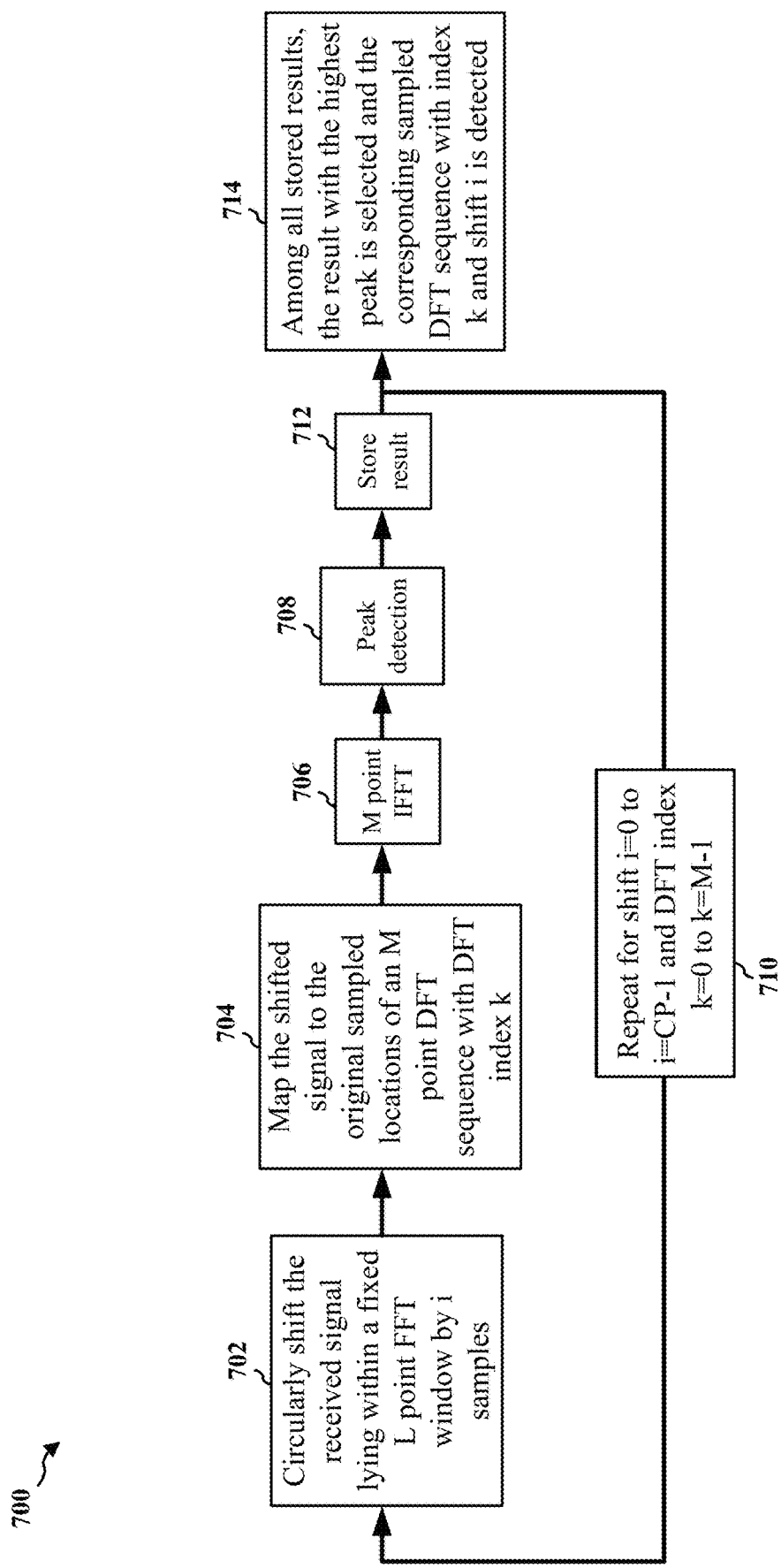
FIG. 7 is a diagram illustrating an example of a sampled DFT sequence detector.

FIG. 7 is a diagram 700 of a sampled DFT sequence detector. A sampled sequence may be smaller and thereby used less resources to transmit. For example, if M=1024 and L=168, then a reduction in resources needed by a factor of ~6 may be achieved. Sampled sequences may not be orthogonal anymore and hence may be susceptible to cross-correlation interference at the receiver. A detector for sampled DFT may, at 702, circularly shift a received signal lying within a fixed L point fast Fourier transform (FFT) window by i samples. The detector may, at 704, map the circularly shifted signal to the original sampled locations of an M point DFT sequence with a DFT index k. The detector may, at 706, perform M point inverse FFT (IFFT). The detector may, at 708, perform peak detection. The detector, at 710, may repeat the process 702 through 712 for shift i=0 to i=CP−1, and DFT index k=0 to k=M−1. The detector, at 712, may store the results. At 714, among all the stored results, the result with the highest peak may be selected, and the corresponding sampled DFT sequence with index k and shift i may be detected.

Figure 8A:
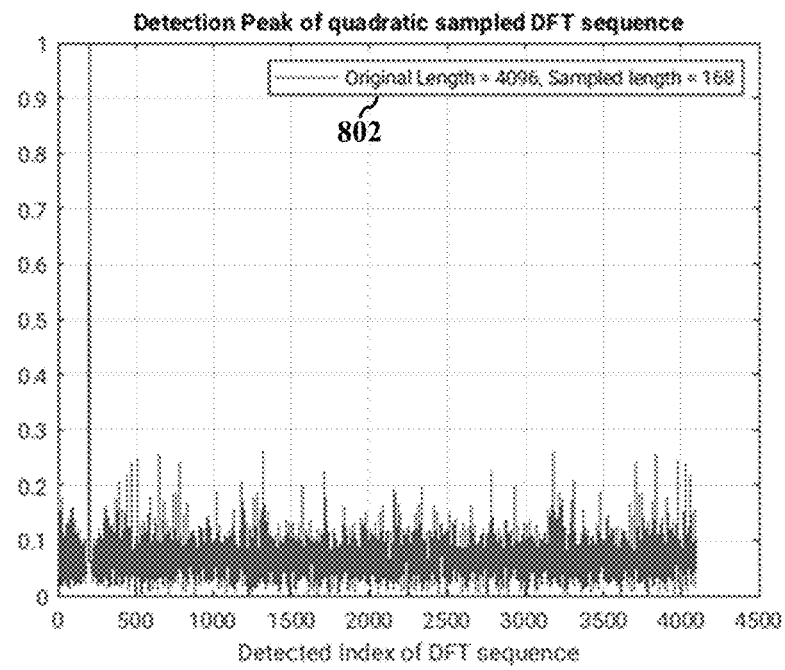
FIGS. 8A and 8B are diagrams illustrating examples of variations in SINR.
Figure 8B:
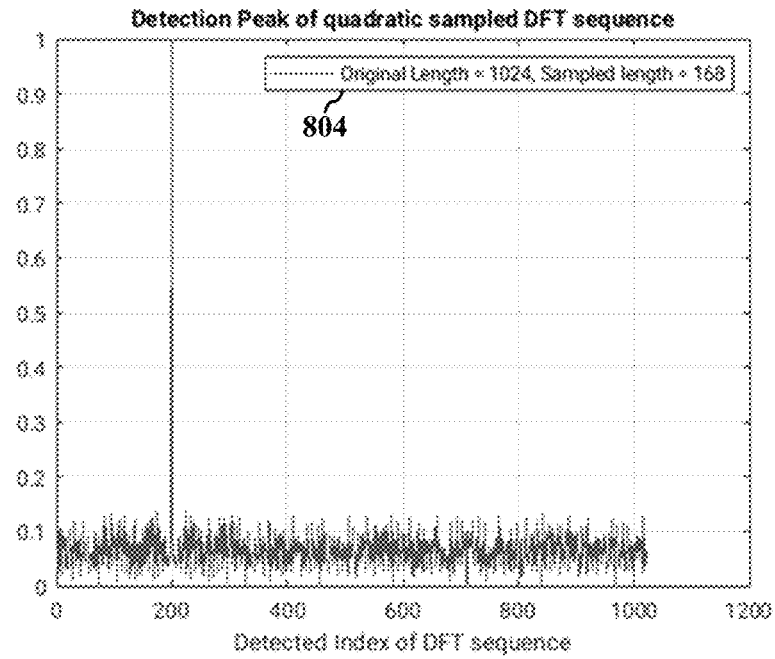

FIGS. 8A and 8B are diagrams 800, 810 of variations in the SINR of operation with sampling factor. Diagram 800 has a sampling factor 802 having an original length of 4096, and a sampled length of 168. Diagram 810 has a sampling factor 804 having an original length of 1024, and a sampled length of 168. As shown in diagrams 800 and 810 of FIGS. 8A and 8B, when a DFT index=200 is detected from among 4096 possible sampled sequences (e.g., diagram 800 of FIG. 8A), the interference level may be higher than when the same index is detected from among 1024 sequences (e.g., diagram 810 of FIG. 8B). Thus, the sampling factor may affect the SINR of operation of PUCCH (e.g., non-coherent PUCCH).

Figure 9A:
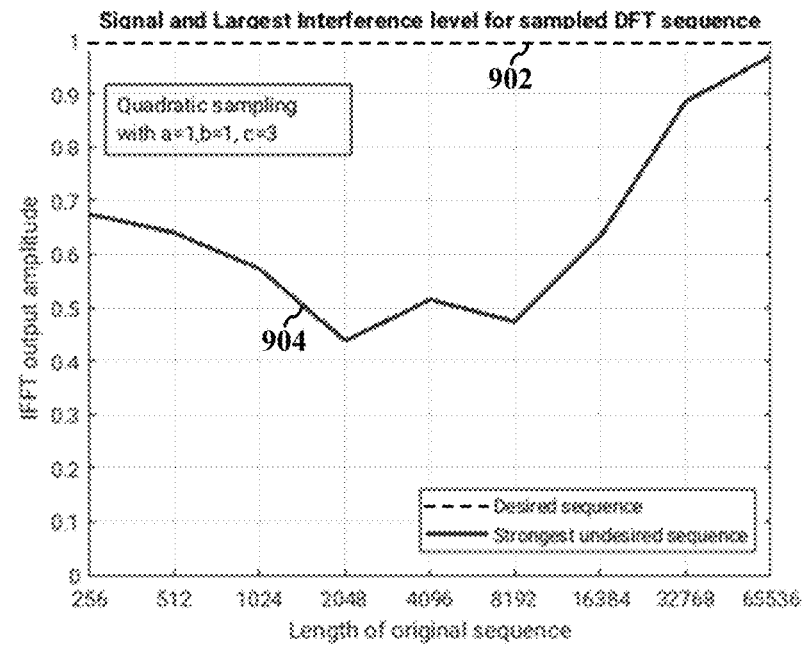
FIGS. 9A and 9B are diagrams illustrating examples of interference levels for sampled sequences.
Figure 9B:
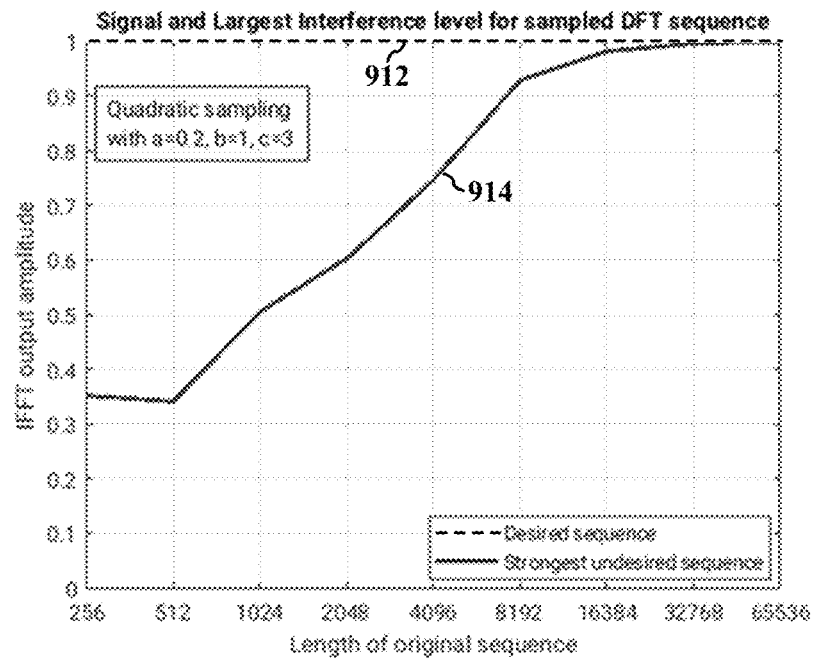

FIGS. 9A and 9B are diagrams 900, 910 of interference levels for sampled sequences. Diagram 900 has a quadratic sampling with a=1, b=1, c=3, a desired sequence 902, and a strongest undesired sequence 904. Diagram 910 has a quadratic sampling with a=0.2, b=1, c=3, a desired sequence 912, and a strongest undesired sequence 914. Interference generally saturates to the signal level as the sampling factor (e.g., original length divided by sampled length) increases, but the actual level may be highly affected by the coefficients of the sampling used. As such, the sampling function may be optimized for PUCCH. Different functions may perform better or provide better results at different sampling factors (e.g., for ≥2048 original length of diagram 900 with a=1 is better, but up to 1024 length of diagram 910 with a=0.2 is better). Thus, as subsampling increases, interference increases which may lead to a change in the optimum sampling factor.

Figure 10:
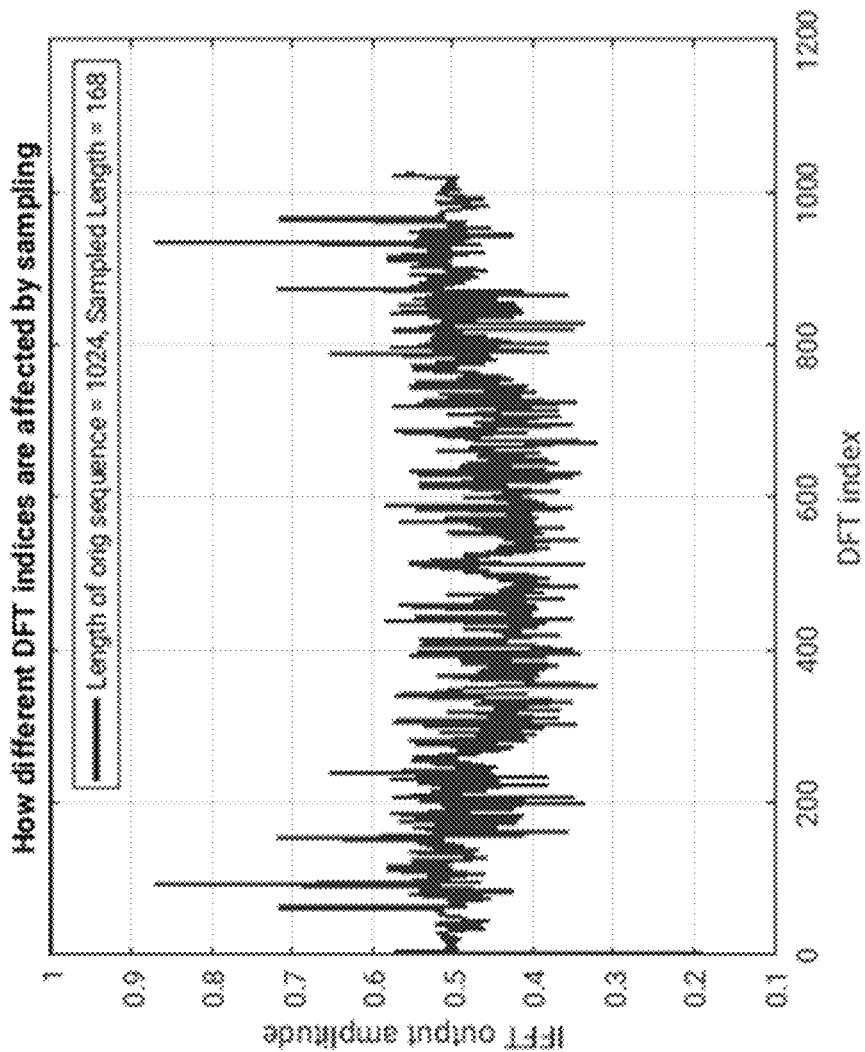
FIG. 10 is a diagram illustrating an example of interference across roots of sampled DFT.

FIG. 10 is a diagram 1000 of the highest cross-interference seen across roots of sampled DFT. The maximum interference faced by a sampled DFT index may vary widely across indices. Some indices may see quite high interference, while other indices may experience reduced levels of interference. As such, it may be beneficial to exclude some indices from transmission as their detection performance may be worse. The diagram 1000 may correspond to the output of the IFFT detector for different indices of a sampled DFT sequence, which may have an original length of 1024, a sampled length of 168, and a quadratic sampling coefficients of a=0.2, b=1, c=3.

Figure 11:
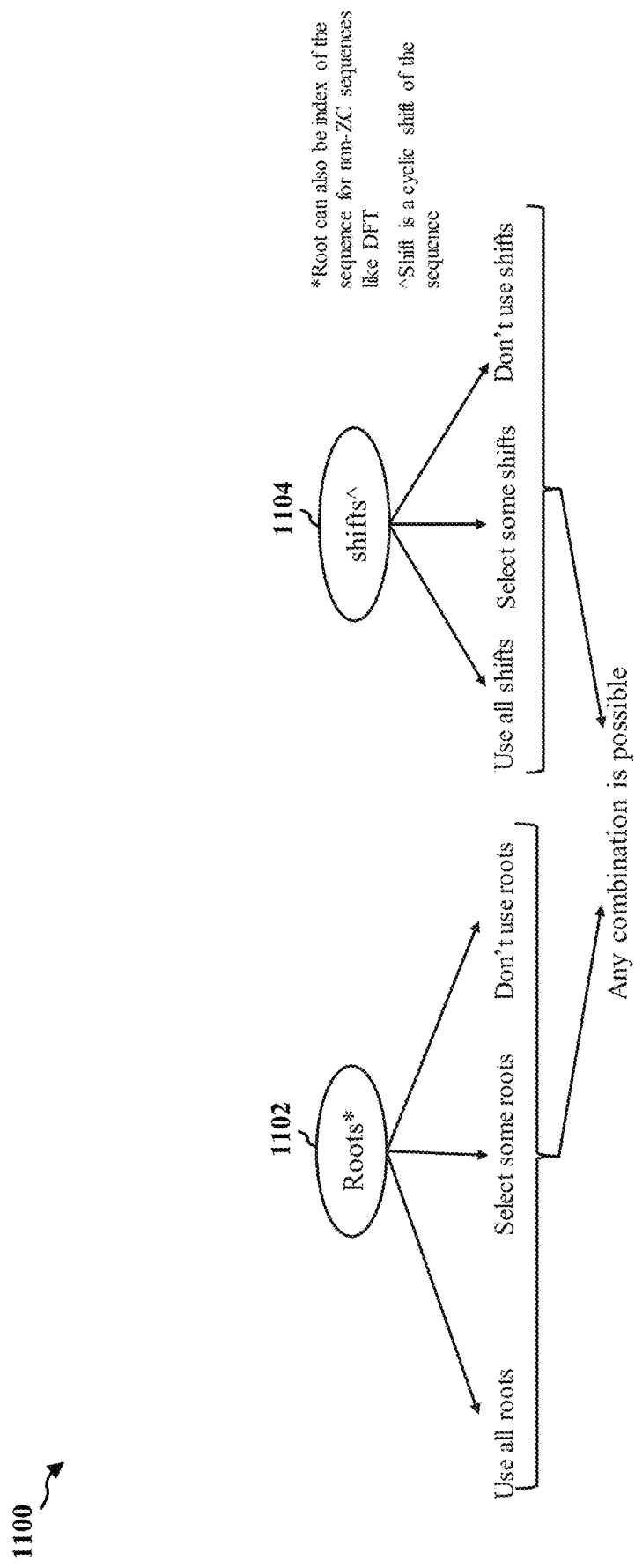
FIG. 11 is a diagram illustrating an example of flexible modes of information encoding.

In some instances, different modes of information encoding may give different signaling capabilities, but may also operate under different interference levels. Adapting the mode of encoding information in a PUCCH sequence based on channel conditions, UE uplink data demand, or the coding requirement of the UE. For example, whether information is encoded into cyclic shifts, the index of the sequence sent, or both. The answer may depend on the combination of the chosen sequence under the given channel conditions or UE requirements. The network may also indicate, during PUCCH configuration, a baseline mode that may be appropriate for the chosen sequence. For example, information may be encoded in the index of a transmitted DFT sequence or root of a Zadoff Chu sequence. Sampling and multipath may affect the number of available indices or shifts in each mode. With reference to diagram 1100 of FIG. 11, for roots 1102, may have the options of using all the roots, selecting some of the roots, or not using the roots, while for shifts 1104, may have the options of using all the shifts, selecting some of the shifts, or not using the shifts, such that any combination may be possible. Root 1102 may also be an index of the sequence for non-Zadoff Chu sequences like DFT. Shifts 1104 may be a cyclic shift of the sequence.

In some instances, the network may signal to only change PUCCH parameters for some uplink messages, such as HARQ-ACK or for all uplink messages including ACK/NACK, CSF, or SR. In some instances, the network may also indicate to change between non-coherent PUCCH and coherent PUCCH as per channel conditions, the amount of bits to be signaled by the UE, and coding requirements of the UE. In some instances, the network may change the PUCCH resource used for CQI reporting via DCI or MAC-CE. This signaling combined with signaling to change PUCCH parameters may allow CQI reporting to take advantage of flexible PUCCH parameters.

In some instances, a PUCCH parameter switch may be triggered by one or more conditions. A base station may monitor uplink conditions via PUSCH, PUCCH, SRS or other uplink channels/signals and may decide autonomously that a better PUCCH parameter(s) may suit the current channel condition and initiates the change of the PUCCH parameter. In some instances, the switch of the parameters may be assisted by the UE. For example, the base station may request a report of downlink channel quality from the UE. This may be periodic, aperiodic, or semi-static. The base station may decide to switch the PUCCH parameters based on the report of the downlink channel quality from the UE. In some instances, the switch of the parameters may be requested by the UE. For example, the UE may request the base station for a new allocation of PUCCH. The request may indicate the type of PUCCH (e.g., length, format, etc.) that the UE would like to use. The request may be generated based on an amount of data the UE needs to send. The base station may determine whether to update the parameters based on the request from the UE. In some instances, the switch of the parameters may be performed by the UE autonomously with the base station's permission. For example, the base station may preconfigure the UE for a set of PUCCH options and may allow the UE to select any of the set of PUCCH options based on the needs or channel assessment of the UE. The base station may monitor all PUCCH resources in the uplink, and the UE may change the PUCCH parameters based on the preconfigured set of PUCCH options. Any changed PUCCH parameters by the base station may be indicated to the UE via a new or updated PUCCH resource set via RRC, MAC-CE, or DCI. In instances where PUCCH parameters are not configured, the PUCCH parameters may be first configured via RRC, and updates may be made to the RRC configured parameters as needed.

Figure 12:
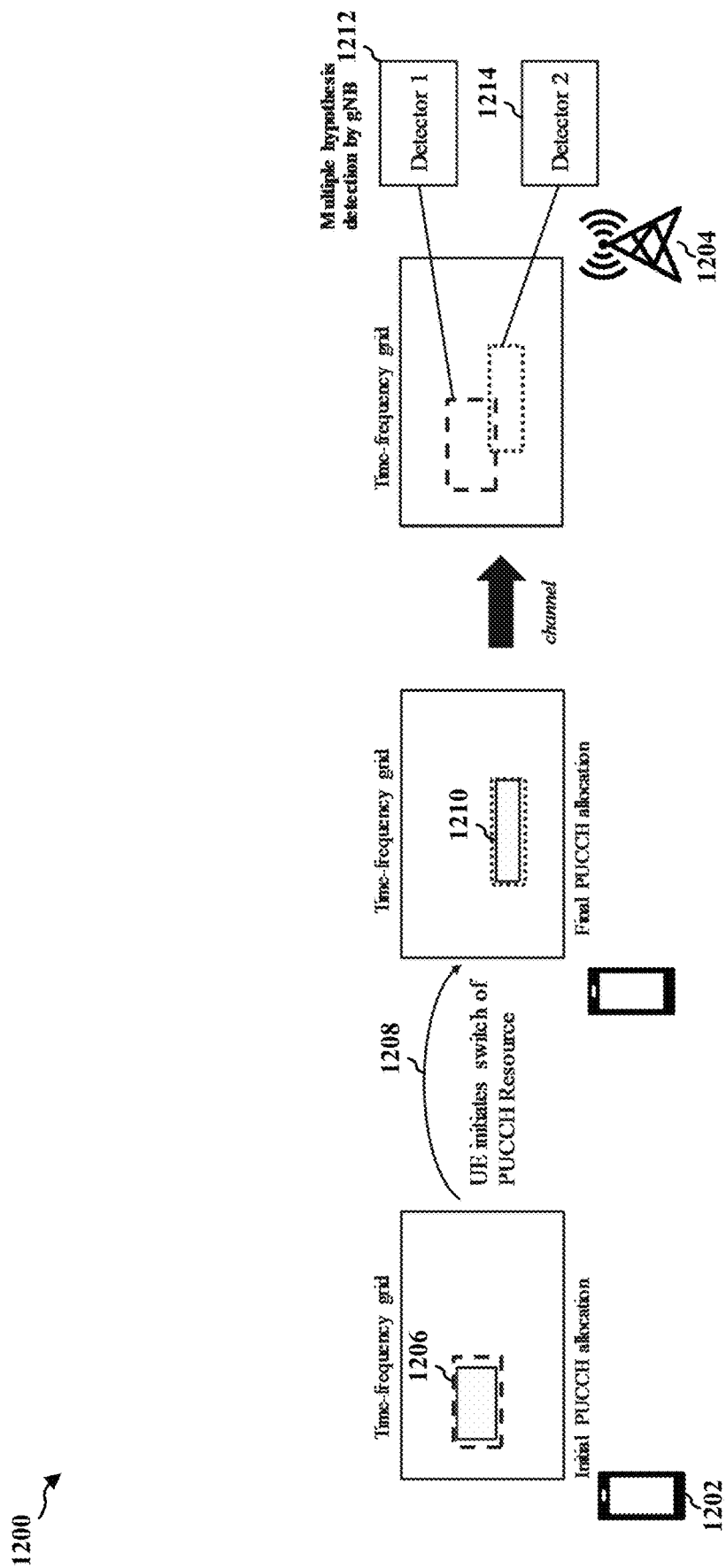
FIG. 12 is a diagram of a UE initiated parameter change.

FIG. 12 is a diagram 1200 of a UE initiated parameter change. The diagram 1200 includes a UE 1202 and a base station 1204. The UE 1202 may have an initial PUCCH allocation 1206. The UE 1202, at 1208, may initiate a switch of PUCCH resource. The UE 1202, at 1210, may have an updated or final PUCCH allocation. The base station 1204 may monitor multiple hypothesis via at least detector 1 1212 and detector 2 1214, and the UE 1202 may transmit using resources that are specific to the new parameters. For example, the base station that monitors for both DFT and Zadoff Chu detection may detect whether the UE selected a DFT or Zadoff Chu sequence to send on the same time/frequency resources. Alternatively, the base station may monitor two separate resources for Zadoff Chu and DFT sequences and one may be successfully received.

Figure 13:
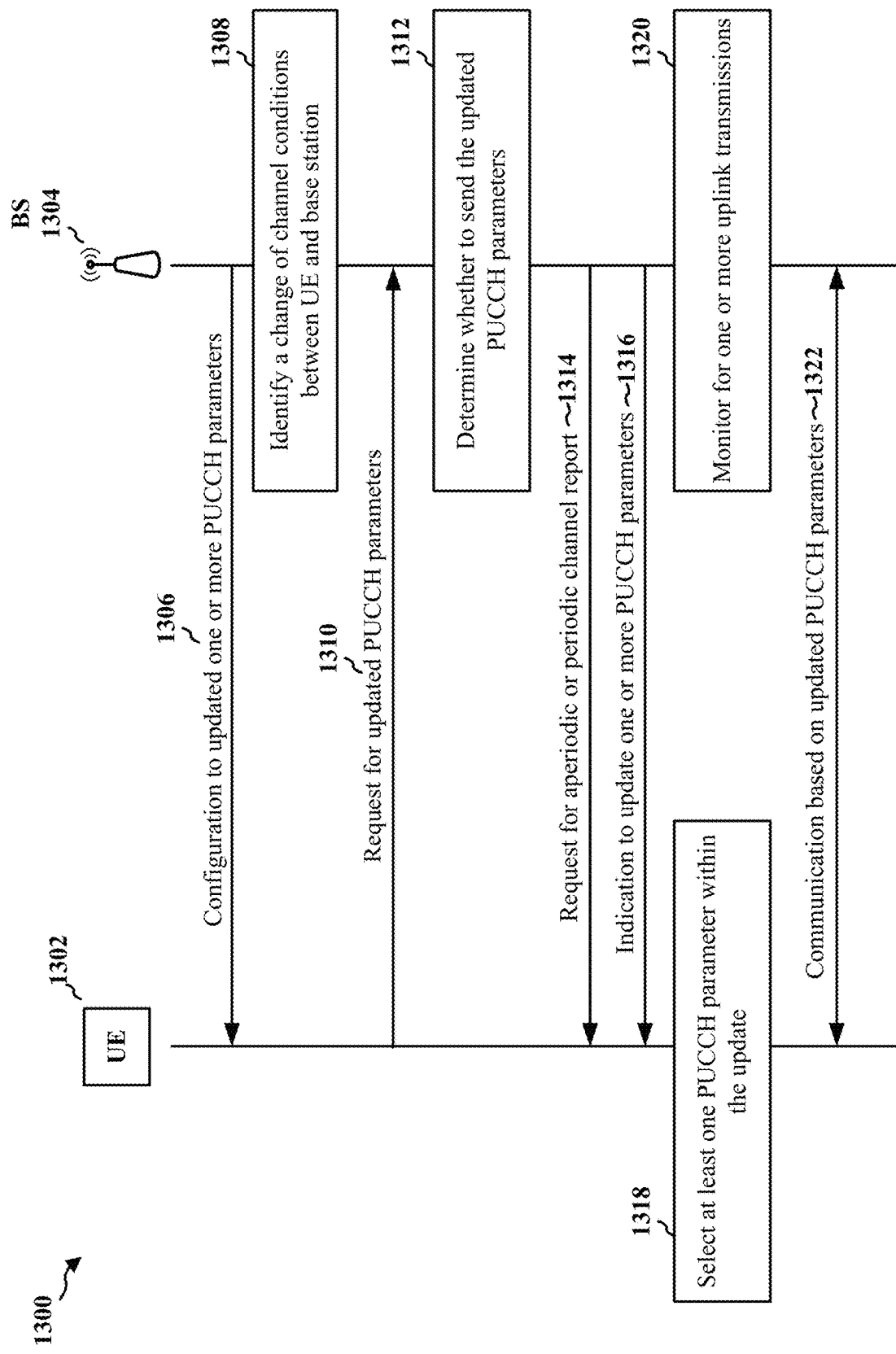
FIG. 13 is a call flow diagram of signaling between a UE and a base station.

FIG. 13 is a call flow diagram 1300 of signaling between a UE 1302 and a base station 1304. The base station 1304 may be configured to provide at least one cell. The UE 1302 may be configured to communicate with the base station 1304. For example, in the context of FIG. 1, the base station 1304 may correspond to base station 102/180 and, accordingly, the cell may include a geographic coverage area 110 in which communication coverage is provided and/or small cell 102' having a coverage area 110'. Further, a UE 1302 may correspond to at least UE 104. In another example, in the context of FIG. 3, the base station 1304 may correspond to base station 310 and the UE 1302 may correspond to UE 350.

At 1306, the base station 1304 may transmit a configuration to update one or more PUCCH parameters. The base station 1304 may transmit the configuration to update the one or more PUCCH parameters to the UE 1302. The UE 1302 may receive the configuration to update the one or more PUCCH parameters from the base station 1304.

At 1308, the base station 1304 may identify a change of channel conditions. The base station 1304 may identify a change of channel conditions between the UE 1302 and the base station 1304. The base station may identify the change of channel conditions based at least on SINR or received signal strength indicator (RSSI). For example, the base station may determine that the change of channel conditions may occur if SINR or RSSI may have changed or fallen below a threshold.

At 1310, the UE 1302 may transmit a request for updated PUCCH parameters to the base station 1304. The base station 1304 may receive the request for updated PUCCH parameters from the UE 1302. In some aspects, the request for the updated PUCCH parameters may be transmitted by the UE 1302 based at least on at least one of a downlink channel condition, a number of bits for transmission by the UE, or a coding requirement of the UE. In some aspects, the updated PUCCH parameters may comprise a preferred type of a PUCCH format.

At 1312, the base station 1304 may determine whether to send the updated PUCCH parameters in response to the request. For example, the request from the UE for updated PUCCH parameters may indicate the type of PUCCH (e.g., length, format) that the UE would like to use. The request from the UE may be generated based on the amount of data the UE would like to send. The base station may review the request from the UE in an effort to determine whether to send the updated PUCCH parameters.

At 1314, the base station 1304 may transmit a request for at least one of an aperiodic channel report or a periodic channel report to the UE 1302. The UE 1302 may receive the request for at least one of the aperiodic channel report of the periodic channel report from the base station 1304. The update of the one or more PUCCH parameters may be based on the aperiodic channel report or the periodic channel report received from the UE.

At 1316, the base station 1304 may transmit an indication to update the one or more PUCCH parameters to the UE 1302. The UE 1302 may receive the indication to update the one or more PUCCH parameters from the base station 1304. The base station may transmit the indication to update the one or more PUCCH parameters based at least on the change of the channel conditions. In some aspects, the update of the one or more PUCCH parameters may be further based on at least one of a number of bits transmitted by the UE or a coding requirement of the UE. In some aspects, the update of the one or more PUCCH parameters may comprise at least one of a signaling capability of a PUCCH format, an encoding of data within the PUCCH, or a type of a PUCCH format. In some aspects, the indication may be transmitted via DCI or MAC-CE. In some aspects, the update of the one or more PUCCH parameters may comprise an addition to an existing PUCCH resource. In some aspects, the update of the one or more PUCCH parameters may comprise a change of at least one field in an existing PUCCH resource. In some aspects, the update of the one or more PUCCH parameters may comprise a selection of the one or more PUCCH parameters from a set of pre-configured PUCCH parameters. In some aspects, the update of the one or more PUCCH parameters may comprise a change of sequence parameters for a PUCCH. The change of the sequence parameters may comprise at least one of a change of a sequence, a change of a sampling function, or a change of a sampling factor. The sampling function may be used to select a sequence of a smaller length from an original sequence. The sampling factor may correspond to a ratio of an original sequence length to a sampled sequence length. In some aspects, the update of the one or more PUCCH parameters may comprise a change of a mode of encoding information in a PUCCH sequence. In some aspects, the update of the one or more PUCCH parameters may be for one or more uplink control information of the UE. The uplink control information may comprise at least one of a HARQ ACK/NACK, a CSF, or an SR. In some aspects, the update of the one or more PUCCH parameters may comprise a switch between non-coherent PUCCH and coherent PUCCH. In some aspects, the update of PUCCH parameters may comprise a change of a PUCCH resource used for transmission of CQI report in the uplink by the UE. In some aspects, transmission of the indication to update the one or more PUCCH parameters may be based on uplink conditions or downlink channel quality reports received from the UE. In some aspects, the base station may allocate one or more PUCCH parameters for selection by the UE.

At 1318, the UE 1302 may select at least one PUCCH parameter of a set of PUCCH parameters. The update of the one or more PUCCH parameters may comprise the set of PUCCH parameters. For example, the update may comprise the allocated one or more PUCCH parameters for selection by the UE. The UE may select the at least one PUCCH parameter of the set of PUCCH parameters within the update.

At 1320, the base station 1304 may monitor for one or more uplink transmissions based on the updated PUCCH parameters. The base station may monitor for one or more uplink transmissions from the UE 1302 based on the updated PUCCH parameters. In some aspects, the updated one or more PUCCH parameters may comprise at least one of the set of PUCCH parameters for selection by the UE allocated by the base station. In some aspects, the updated one or more PUCCH parameters may comprise at least one of the set of PUCCH parameters indicated by the base station in response to the change of the channel conditions.

At 1322, the base station 1034 and the UE 1302 may communicate based on a PUCCH having the one or more PUCCH parameters updated. The base station and the UE may communicate based on the PUCCH having the one or more PUCCH parameters updated.

Figure 14:
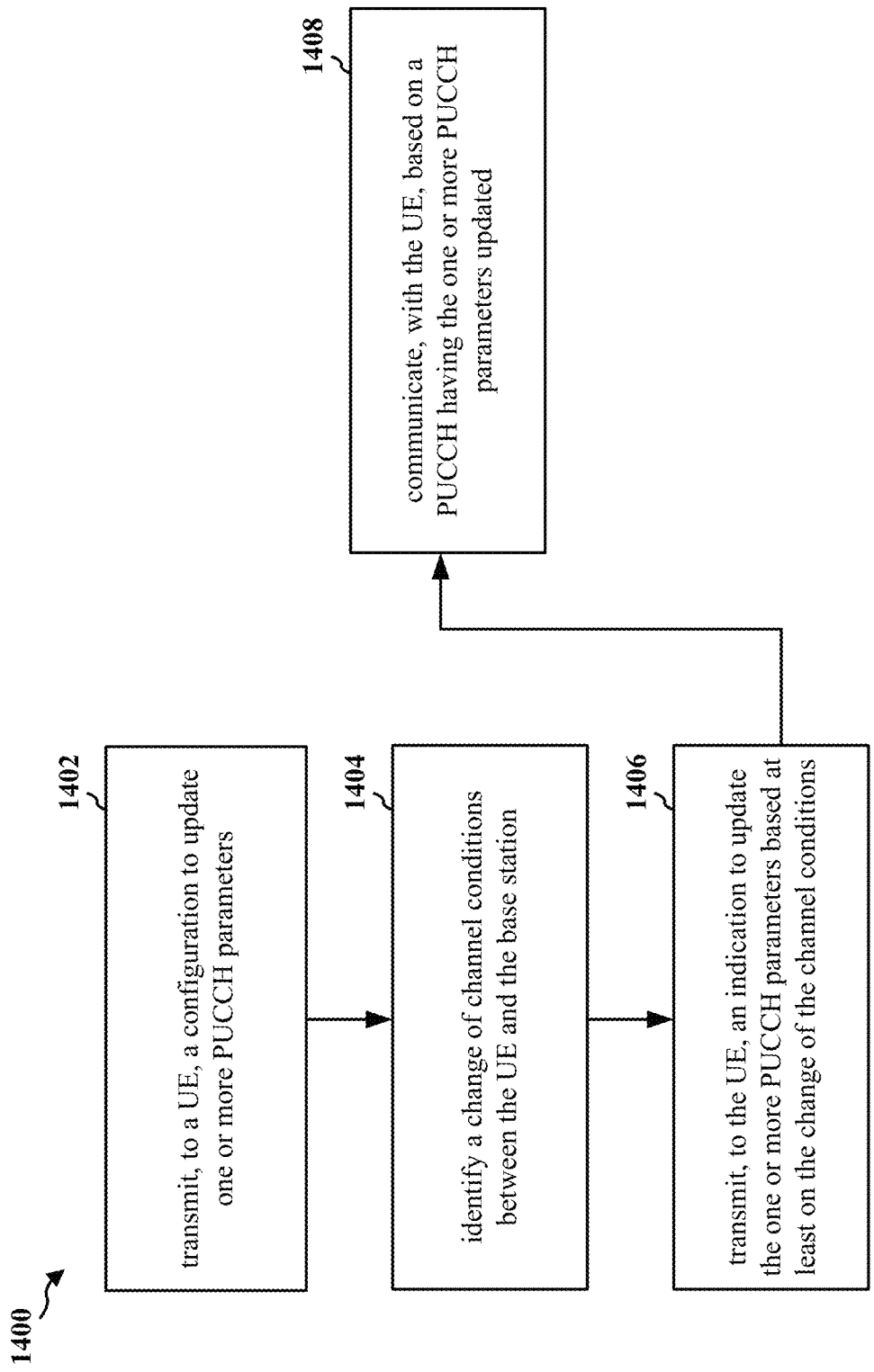
FIG. 14 is a flowchart of a method of wireless communication.

FIG. 14 is a flowchart 1400 of a method of wireless communication. The method may be performed by a base station or a component of a base station (e.g., the base station 102/180; the apparatus 1602; the baseband unit 1604, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to update one or more PUCCH parameters based on channel conditions.

At 1402, the base station may transmit a configuration to update one or more PUCCH parameters. For example, 1402 may be performed by update component 1640 of apparatus 1602. The base station may transmit the configuration to update the one or more PUCCH parameters to a UE.

At 1404, the base station may identify a change of channel conditions. For example, 1404 may be performed by identification component 1642 of apparatus 1602. The base station may identify a change of channel conditions between the UE and the base station. The base station may identify the change of channel conditions based at least on SINR or RSSI. For example, the base station may determine that the change of channel conditions may occur if SINR or RSSI may have changed or fallen below a threshold.

At 1406, the base station may transmit an indication to update the one or more PUCCH parameters. For example, 1406 may be performed by update component 1640 of apparatus 1602. The base station may transmit the indication to update the one or more PUCCH parameters to the UE. The base station may transmit the indication to update the one or more PUCCH parameters based at least on the change of the channel conditions. In some aspects, the update of the one or more PUCCH parameters may be further based on at least one of a number of bits transmitted by the UE or a coding requirement of the UE. In some aspects, the update of the one or more PUCCH parameters may comprise at least one of a signaling capability of a PUCCH format, an encoding of data within the PUCCH, or a type of a PUCCH format. In some aspects, the indication may be transmitted via downlink control information (DCI) or media access control (MAC) control element (CE) (MAC-CE). In some aspects, the update of the one or more PUCCH parameters may comprise an addition to an existing PUCCH resource. In some aspects, the update of the one or more PUCCH parameters may comprise a change of at least one field in an existing PUCCH resource. In some aspects, the update of the one or more PUCCH parameters may comprise a selection of the one or more PUCCH parameters from a set of pre-configured PUCCH parameters. In some aspects, the update of the one or more PUCCH parameters may comprise a change of sequence parameters for a PUCCH. The change of the sequence parameters may comprise at least one of a change of a sequence, a change of a sampling function, or a change of a sampling factor. The sampling function may be used to select a sequence of a smaller length from an original sequence. The sampling factor may correspond to a ratio of an original sequence length to a sampled sequence length. In some aspects, the sampling function may select a non-orthogonal sequence that may allow for sending more information than an orthogonal sequence but with an increased signal to interference ratio. In some aspects, the sampling function may select an orthogonal sequence that may allow for sending lesser information at an increased signal to interference ratio in comparison to a non-orthogonal sequence. In some aspects, the sampling function may select a sampling function and/or sampling function coefficients which may be optimized for a specific sequence at a specific sampling factor, which may provide an increased signal to interference ratio. In some aspects, the sampling function may select a sampling factor based at least on one or more of the channel condition, the sequence chosen, UE coding requirement, or number of bits to be transmitted by the UE. In some aspects, the update of the one or more PUCCH parameters may comprise a change of a mode of encoding information in a PUCCH sequence. In some aspects, the update of the one or more PUCCH parameters may comprise selecting the method of encoding data within PUCCH from at least one or more of roots, indices, and shifts of a sequence based on the sequence used, channel conditions, UE coding requirement, and the number of bits to be transmitted by the UE. In some aspects, the update of the one or more PUCCH parameters may comprise not transmitting specific roots, indices or shifts of a sampled PUCCH sequence based on the signal to interference level at those roots, indices or shifts being less than certain threshold. In some aspects, the update of the one or more PUCCH parameters may be for one or more uplink control information of the UE. The uplink control information may comprise at least one of a HARQ ACK/NACK, a channel state feedback (CSF), or a scheduling request (SR). In some aspects, the update of the one or more PUCCH parameters may comprise a switch between non-coherent PUCCH and coherent PUCCH. In some aspects, the update of PUCCH parameters may comprise a change of a PUCCH resource used for transmission of channel quality indicator (CQI) report in the uplink by the UE. In some aspects, transmission of the indication to update the one or more PUCCH parameters may be based on uplink conditions or downlink channel quality reports received from the UE.

At 1408, the base station may communicate based on a PUCCH having the one or more PUCCH parameters updated. For example, 1408 may be performed by communication component 1650 of apparatus 1602. The base station may communicate with the UE based on the PUCCH having the one or more PUCCH parameters updated.

Figure 15:
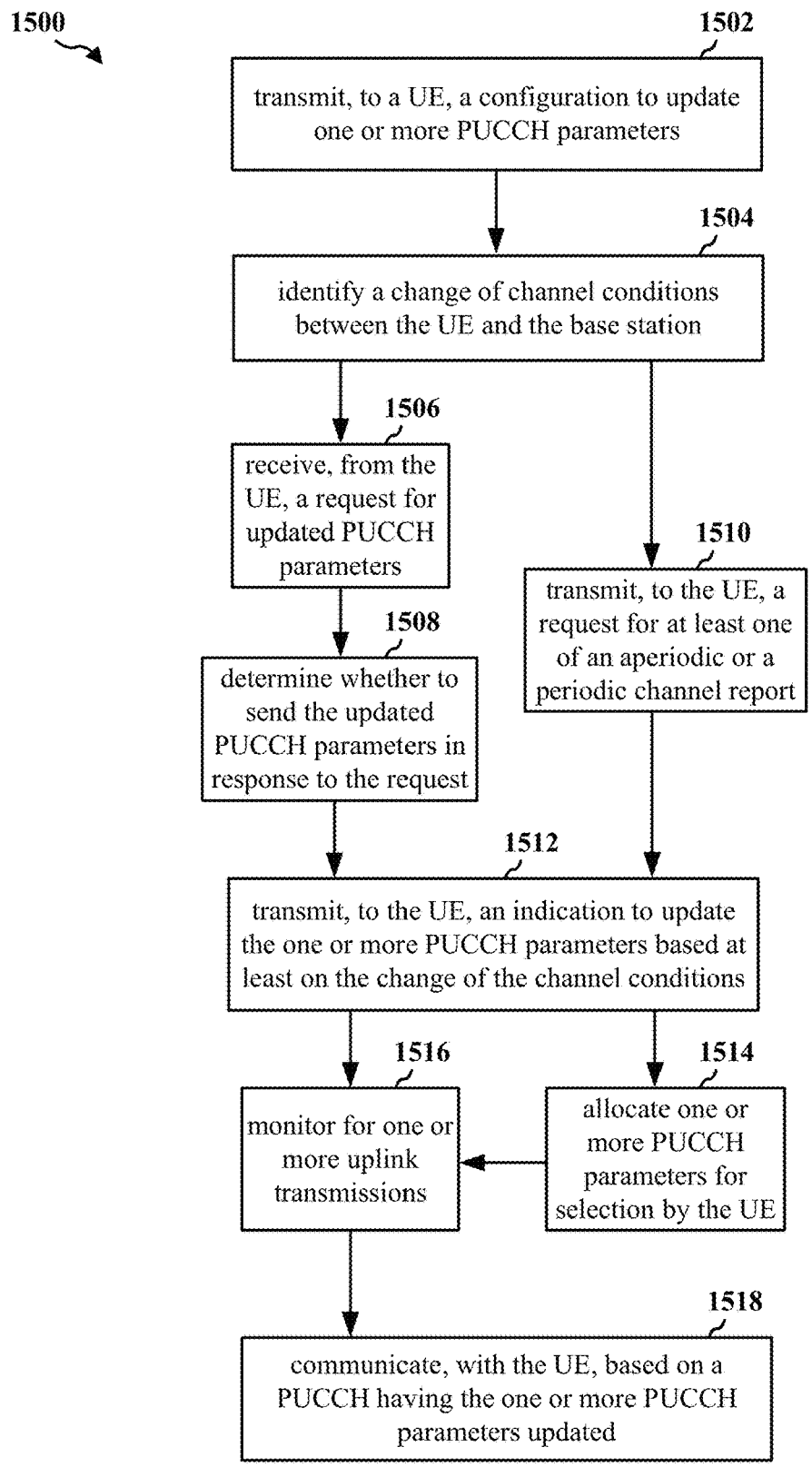
FIG. 15 is a flowchart of a method of wireless communication.

FIG. 15 is a flowchart 1500 of a method of wireless communication. The method may be performed by a base station or a component of a base station (e.g., the base station 102/180; the apparatus 1602; the baseband unit 1604, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to update one or more PUCCH parameters based on channel conditions.

At 1502, the base station may transmit a configuration to update one or more PUCCH parameters. For example, 1502 may be performed by update component 1640 of apparatus 1602. The base station may transmit the configuration to update the one or more PUCCH parameters to a UE.

At 1504, the base station may identify a change of channel conditions. For example, 1504 may be performed by identification component 1642 of apparatus 1602. The base station may identify a change of channel conditions between the UE and the base station. The base station may identify the change of channel conditions based on SINR or RSSI. For example, the base station may determine that the change of channel conditions may occur if SINR or RSSI may have changed or fallen below a threshold.

At 1506, the base station may receive a request for updated PUCCH parameters. For example, 1506 may be performed by update component 1640 of apparatus 1602. The base station may receive the request for the updated PUCCH parameters from the UE. In some aspects, the request for the updated PUCCH parameters may be transmitted by the UE based at least on at least one of a downlink channel condition, a number of bits for transmission by the UE, or a coding requirement of the UE. In some aspects, the updated PUCCH parameters may comprise a preferred type of a PUCCH format.

At 1508, the base station may determine whether to send the updated PUCCH parameters in response to the request. For example, 1508 may be performed by update component 1640 of apparatus 1602. For example, the request from the UE for updated PUCCH parameters may indicate the type of PUCCH (e.g., length, format) that the UE would like to use. The request from the UE may be generated based on the amount of data the UE would like to send. The base station may review the request from the UE in an effort to determine whether to send the updated PUCCH parameters.

At 1510, the base station may transmit a request for at least one of an aperiodic channel report or a periodic channel report. For example, 1510 may be performed by report component 1644 of apparatus 1602. The base station may transmit the request for at least one of the aperiodic channel report or the periodic channel report to the UE. The update of the one or more PUCCH parameters may be based on the aperiodic channel report or the periodic channel report received from the UE.

At 1512, the base station may transmit an indication to update the one or more PUCCH parameters. For example, 1512 may be performed by update component 1640 of apparatus 1602. The base station may transmit the indication to update the one or more PUCCH parameters to the UE. The base station may transmit the indication to update the one or more PUCCH parameters based at least on the change of the channel conditions. In some aspects, the update of the one or more PUCCH parameters may be further based on at least one of a number of bits transmitted by the UE or a coding requirement of the UE. In some aspects, the update of the one or more PUCCH parameters may comprise at least one of a signaling capability of a PUCCH format, an encoding of data within the PUCCH, or a type of a PUCCH format. In some aspects, the indication may be transmitted via DCI or MAC-CE. In some aspects, the update of the one or more PUCCH parameters may comprise an addition to an existing PUCCH resource. In some aspects, the update of the one or more PUCCH parameters may comprise a change of at least one field in an existing PUCCH resource. In some aspects, the update of the one or more PUCCH parameters may comprise a selection of the one or more PUCCH parameters from a set of pre-configured PUCCH parameters. In some aspects, the update of the one or more PUCCH parameters may comprise a change of sequence parameters for a PUCCH. The change of the sequence parameters may comprise at least one of a change of a sequence, a change of a sampling function, or a change of a sampling factor. The sampling function may be used to select a sequence of a smaller length from an original sequence. The sampling factor may correspond to a ratio of an original sequence length to a sampled sequence length. In some aspects, the update of the one or more PUCCH parameters may comprise a change of a mode of encoding information in a PUCCH sequence. In some aspects, the update of the one or more PUCCH parameters may be for one or more uplink control information of the UE. The uplink control information may comprise at least one of a HARQ ACK/NACK, a CSF, or an SR. In some aspects, the update of the one or more PUCCH parameters may comprise a switch between non-coherent PUCCH and coherent PUCCH. In some aspects, the update of PUCCH parameters may comprise a change of a PUCCH resource used for transmission of CQI report in the uplink by the UE. In some aspects, transmission of the indication to update the one or more PUCCH parameters may be based on uplink conditions or downlink channel quality reports received from the UE.

At 1514, the base station may allocate one or more PUCCH parameters for selection. For example, 1514 may be performed by allocation component 1646 of apparatus 1602. The base station may allocation one or more PUCCH parameters for selection by the UE.

At 1516, the base station may monitor for one or more uplink transmissions based on the updated PUCCH parameters. For example, 1516 may be performed by monitor component 1648 of apparatus 1602. The base station may monitor for one or more uplink transmissions from the UE based on the updated PUCCH parameters. The update of the one or more PUCCH parameters may comprise a set of PUCCH parameters for selection by the UE.

At 1518, the base station may communicate based on a PUCCH having the one or more PUCCH parameters updated. For example, 1518 may be performed by communication component 1650 of apparatus 1602. The base station may communicate with the UE based on the PUCCH having the one or more PUCCH parameters updated.

Figure 16:
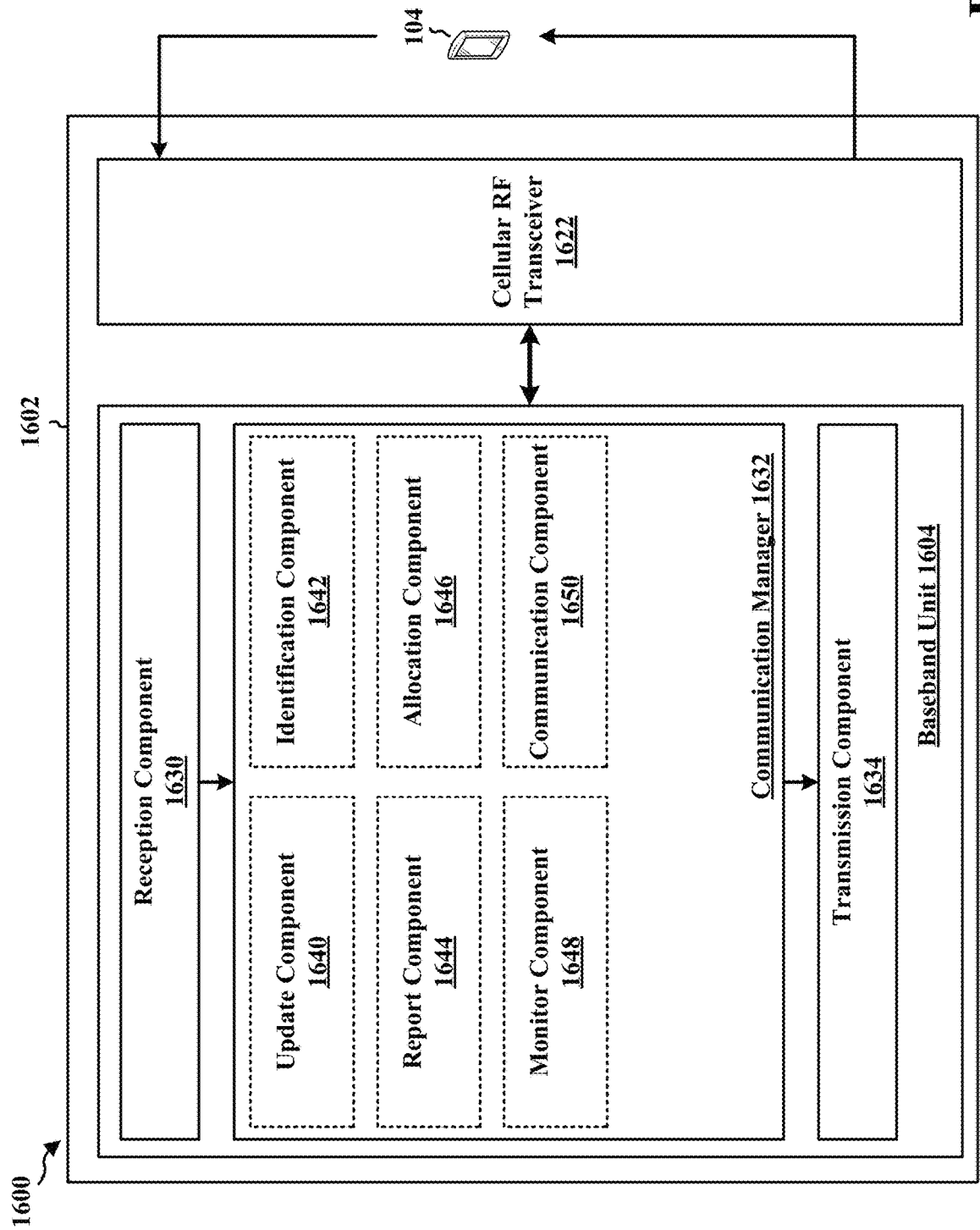
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes an update component 1640 that may transmit a configuration to update one or more PUCCH parameters, e.g., as described in connection with 1402 of FIG. 14 or 1502 of FIG. 15. The update component 1640 may be further configured to transmit an indication to update the one or more PUCCH parameters, e.g., as described in connection with 1406 of FIG. 14 or 1512 of FIG. 15. The update component 1640 may be further configured to receive a request for updated PUCCH parameters, e.g., as described in connection with 1506 of FIG. 15. The update component 1640 may be further configured to determine whether to send the updated PUCCH parameters in response to the request, e.g., as described in connection with 1508 of FIG. 15. The communication manager 1632 further includes an identification component 1642 that may identify a change of channel conditions, e.g., as described in connection with 1404 of FIG. 14 or 1504 of FIG. 15. The communication manager 1632 further includes a report component 1644 that may transmit a request for at least one of an aperiodic channel report or a periodic channel report, e.g., as described in connection with 1510 of FIG. 15.

The communication manager 1632 further includes an allocation component 1646 that may allocate one or more PUCCH parameters for selection, e.g., as described in connection with 1514 of FIG. 15. The communication manager 1632 further includes a monitor component 1648 that may monitor for one or more uplink transmissions based on the updated PUCCH parameters, e.g., as described in connection with 1516 of FIG. 15. The communication manager 1632 further includes a communication component 1650 that may communicate based on a PUCCH having the one or more PUCCH parameters updated, e.g., as described in connection with 1408 of FIG. 14 or 1518 of FIG. 15.

The apparatus may include additional components that perform each of the blocks of the algorithm in the flowcharts of FIGS. 14 and 15. As such, each block in the flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for transmitting, to a UE, a configuration to update one or more PUCCH parameter. The apparatus includes means for identifying a change of channel conditions between the UE and the base station. The apparatus includes means for transmitting, to the UE, an indication to update the one or more PUCCH parameters based at least on the change of the channel conditions. The apparatus includes means for communicating, with the UE, based on a PUCCH having the one or more PUCCH parameters updated. The apparatus further includes means for receiving, from the UE, a request for updated PUCCH parameters. The apparatus further includes means for determining whether to send the updated PUCCH parameters in response to the request. The apparatus further includes means for transmitting, to the UE, a request for at least one of an aperiodic or a periodic channel report. The update of the one or more PUCCH parameters is based on the aperiodic or the periodic channel report received from the UE. The apparatus further includes means for monitoring for one or more uplink transmissions based on the updated PUCCH parameters. The update of the one or more PUCCH parameters comprises a set of PUCCH parameters for selection by the UE. The apparatus further includes means for allocating one or more PUCCH parameters for selection by the UE. The apparatus further includes means for monitoring for one or more uplink transmissions based on the one or more PUCCH parameters allocated for selection by the UE. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 17:
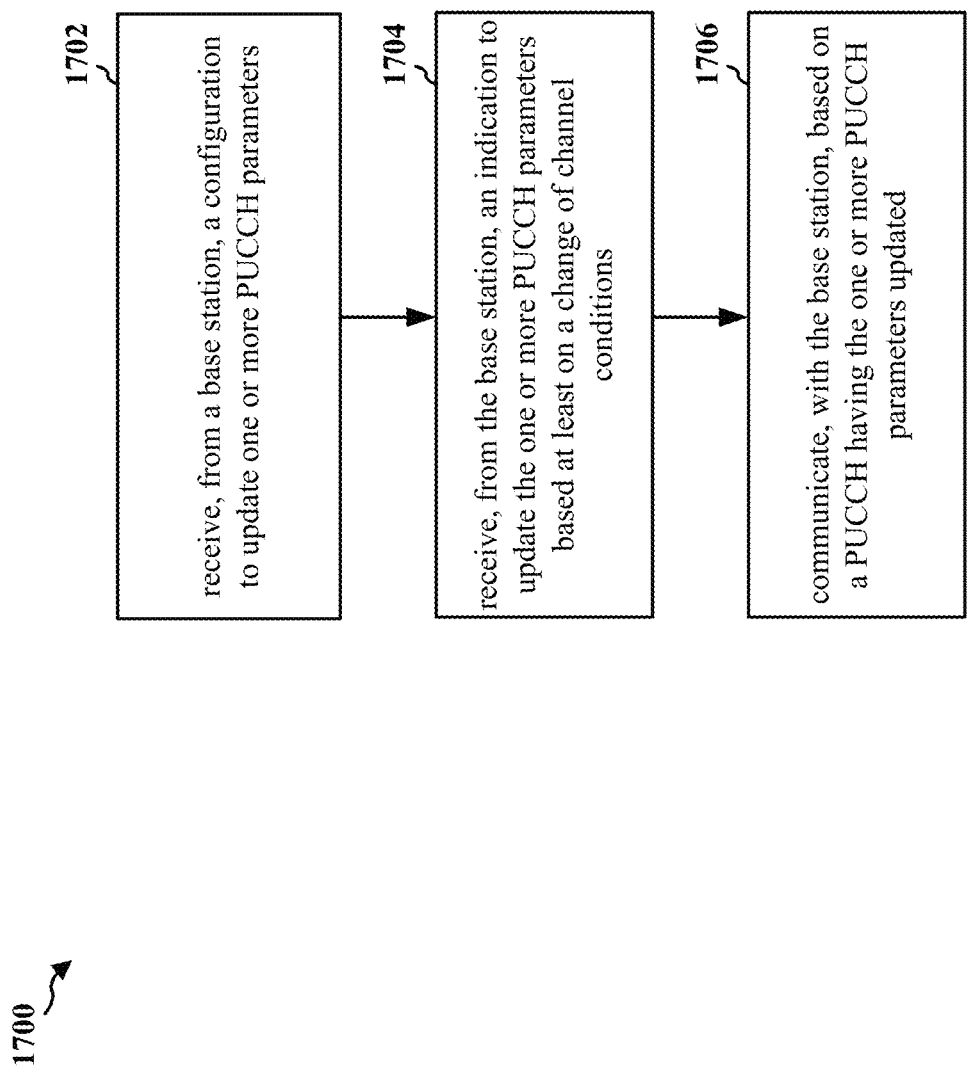
FIG. 17 is a flowchart of a method of wireless communication.

FIG. 17 is a flowchart 1700 of a method of wireless communication. The method may be performed by a UE or a component of a UE (e.g., the UE 104; the apparatus 1902; the cellular baseband processor 1904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to receive an indication to update one or more PUCCH parameters based on channel conditions.

At 1702, the UE may receive a configuration to update one or more PUCCH parameters. For example, 1702 may be performed by update component 1940 of apparatus 1902. The UE may receive the configuration to update the one or more PUCCH parameters from a base station.

At 1704, the UE may receive an indication to update the one or more PUCCH parameters. For example, 1704 may be performed by update component 1940 of apparatus 1902. The UE may receive the indication to update the one or more PUCCH parameters from the base station. The indication to update the one or more PUCCH parameters may be transmitted to the UE based at least on a change of channel conditions. In some aspects, the update of the one or more PUCCH parameters may be further based on at least one of a number of bits transmitted by the UE or a coding requirement of the UE. In some aspects, the update of the one or more PUCCH parameters may comprise at least one of a signaling capability of a PUCCH format, an encoding of data within the PUCCH, or a type of a PUCCH format. In some aspects, the indication may be transmitted via DCI or MAC-CE. In some aspects, the update of the one or more PUCCH parameters may comprise an addition to an existing PUCCH resource. In some aspects, the update of the one or more PUCCH parameters may comprise a change of at least one field in an existing PUCCH resource. In some aspects, the update of the one or more PUCCH parameters may comprise a selection of the one or more PUCCH parameters from a set of pre-configured PUCCH parameters. In some aspects, the update of the one or more PUCCH parameters may comprise a change of sequence parameters for a PUCCH. The change of the sequence parameters may comprise at least one of a change of a sequence, a change of a sampling function, or a change of a sampling factor. The sampling function may be used to select a sequence of a smaller length from an original sequence. The sampling factor may correspond to a ratio of an original sequence length to a sampled sequence length. In some aspects, the update of the one or more PUCCH parameters may comprise a change of a mode of encoding information in a PUCCH sequence. In some aspects, the update of the one or more PUCCH parameters may be for one or more uplink control information of the UE. The uplink control information may comprise at least one of a HARQ ACK/NACK, a CSF, or a SR. In some aspects, the update of the one or more PUCCH parameters may comprise a switch between non-coherent PUCCH and coherent PUCCH. In some aspects, the update of PUCCH parameters may comprise a change of a PUCCH resource used for transmission of CQI report in the uplink by the UE. In some aspects, transmission of the indication to update the one or more PUCCH parameters may be based on uplink conditions or downlink channel quality reports received from the UE.

At 1706, the UE may communicate based on a PUCCH having the one or more PUCCH parameters updated. For example, 1706 may be performed by communication component 1944 of apparatus 1902. The UE may communicate with the base station based on the PUCCH having the one or more updated PUCCH parameters.

Figure 18:
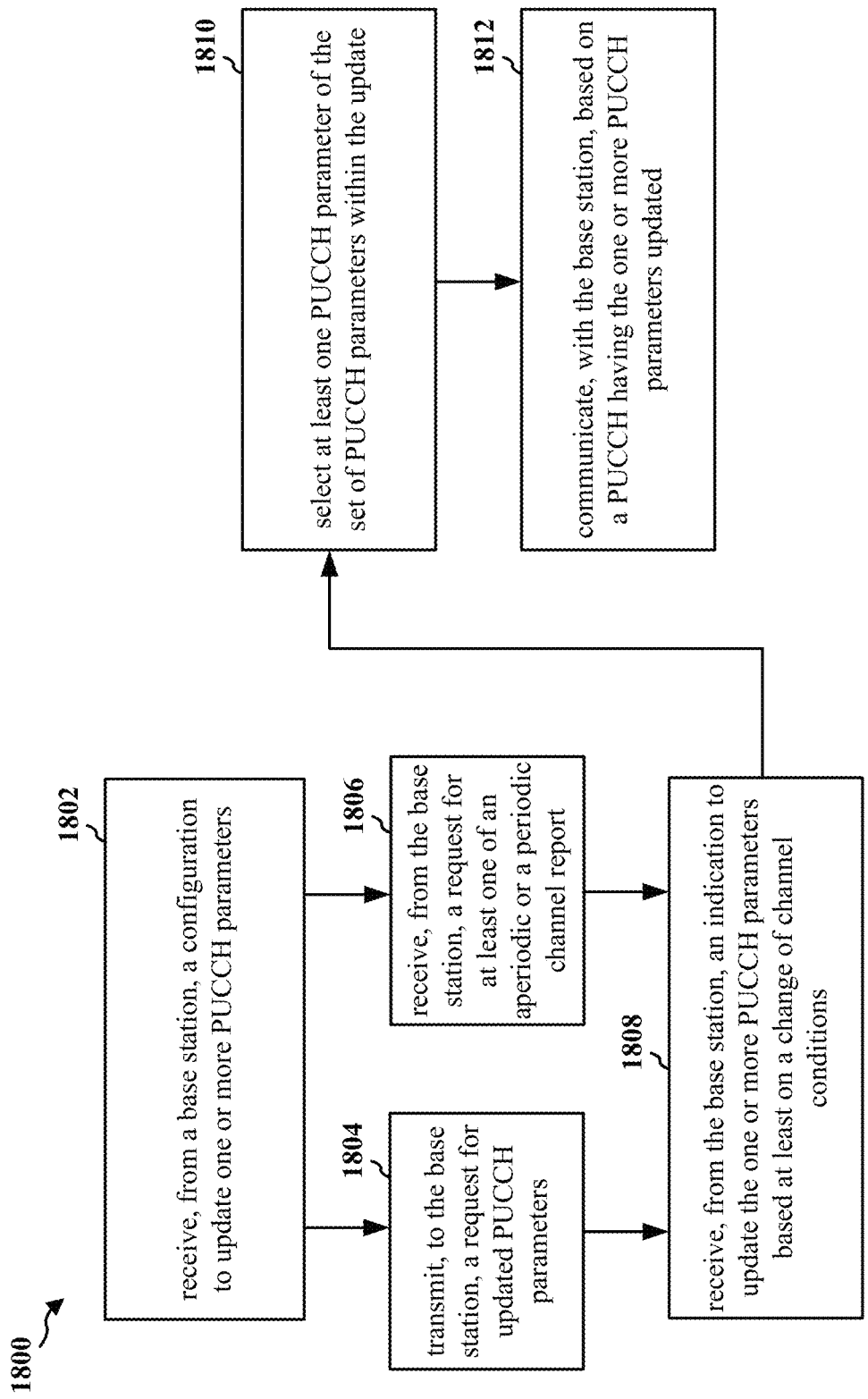
FIG. 18 is a flowchart of a method of wireless communication.

FIG. 18 is a flowchart 1800 of a method of wireless communication. The method may be performed by a UE or a component of a UE (e.g., the UE 104; the apparatus 1902; the cellular baseband processor 1904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to receive an indication to update one or more PUCCH parameters based on channel conditions.

At 1802, the UE may receive a configuration to update one or more PUCCH parameters. For example, 1802 may be performed by update component 1940 of apparatus 1902. The UE may receive the configuration to update the one or more PUCCH parameters from a base station.

At 1804, the UE may transmit a request for updated PUCCH parameters. For example, 1804 may be performed by update component 1940 of apparatus 1902. The UE may transmit the request for updated PUCCH parameters to the base station. In some aspects, the request for the updated PUCCH parameters may be transmitted by the UE based at least on at least one of a downlink channel condition, a number of bits for transmission by the UE, or a coding requirement of the UE. In some aspects, the updated PUCCH parameters may comprise a preferred type of a PUCCH format.

At 1806, the UE may receive a request for at least one of an aperiodic channel report or a periodic channel report. For example, 1806 may be performed by report component 1946. The UE may receive the request for at least one of the aperiodic channel report or the periodic channel report from the base station. The update of the one or more PUCCH parameters may be based on the aperiodic or the periodic channel report transmitted to the base station.

At 1808, the UE may receive an indication to update the one or more PUCCH parameters. For example, 1808 may be performed by update component 1940 of apparatus 1902. The UE may receive the indication to update the one or more PUCCH parameters from the base station. The indication to update the one or more PUCCH parameters may be transmitted to the UE based at least on a change of channel conditions. In some aspects, the update of the one or more PUCCH parameters may be further based on at least one of a number of bits transmitted by the UE or a coding requirement of the UE. In some aspects, the update of the one or more PUCCH parameters may comprise at least one of a signaling capability of a PUCCH format, an encoding of data within the PUCCH, or a type of a PUCCH format. In some aspects, the indication may be transmitted via DCI or MAC-CE. In some aspects, the update of the one or more PUCCH parameters may comprise an addition to an existing PUCCH resource. In some aspects, the update of the one or more PUCCH parameters may comprise a change of at least one field in an existing PUCCH resource. In some aspects, the update of the one or more PUCCH parameters may comprise a selection of the one or more PUCCH parameters from a set of pre-configured PUCCH parameters. In some aspects, the update of the one or more PUCCH parameters may comprise a change of sequence parameters for a PUCCH. The change of the sequence parameters may comprise at least one of a change of a sequence, a change of a sampling function, or a change of a sampling factor. The sampling function may be used to select a sequence of a smaller length from an original sequence. The sampling factor may correspond to a ratio of an original sequence length to a sampled sequence length. In some aspects, the update of the one or more PUCCH parameters may comprise a change of a mode of encoding information in a PUCCH sequence. In some aspects, the update of the one or more PUCCH parameters may be for one or more uplink control information of the UE. The uplink control information may comprise at least one of a HARQ ACK/NACK, a CSF, or a SR. In some aspects, the update of the one or more PUCCH parameters may comprise a switch between non-coherent PUCCH and coherent PUCCH. In some aspects, the update of PUCCH parameters may comprise a change of a PUCCH resource used for transmission of CQI report in the uplink by the UE. In some aspects, transmission of the indication to update the one or more PUCCH parameters may be based on uplink conditions or downlink channel quality reports received from the UE.

At 1810, the UE may select at least one PUCCH parameter of a set of PUCCH parameters. For example, 1810 may be performed by selection component 1942 of apparatus 1902. The update of the one or more PUCCH parameters may comprise the set of PUCCH parameters. The UE may select the at least one PUCCH parameter of the set of PUCCH parameters within the update.

At 1812, the UE may communicate based on a PUCCH having the one or more PUCCH parameters updated. For example, 1812 may be performed by communication component 1944 of apparatus 1902. The UE may communicate with the base station based on the PUCCH having the one or more updated PUCCH parameters.

Figure 19:
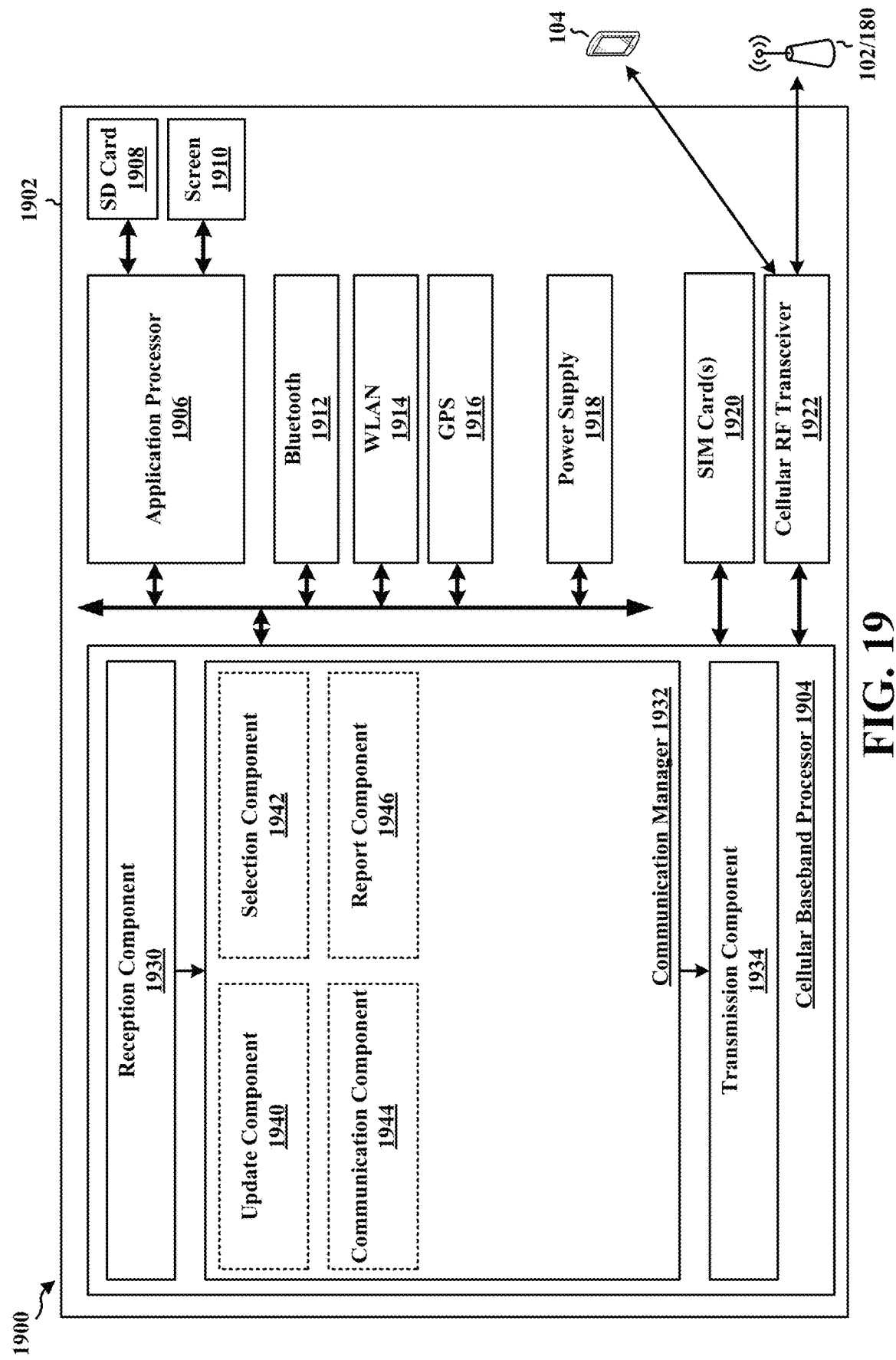
FIG. 19 is a diagram illustrating an example of a hardware implementation for an example apparatus.

FIG. 19 is a diagram 1900 illustrating an example of a hardware implementation for an apparatus 1902. The apparatus 1902 may be a UE, a component of a UE, or may implement UE functionality. In some aspects, the apparatus 1902 may include a cellular baseband processor 1904 (also referred to as a modem) coupled to a cellular RF transceiver 1922. In some aspects, the apparatus 1902 may further include one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, or a power supply 1918. The cellular baseband processor 1904 communicates through the cellular RF transceiver 1922 with the UE 104 and/or BS 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904. The cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., see 350 of FIG. 3) and include the additional modules of the apparatus 1902.

The communication manager 1932 includes an update component 1940 that is configured to receive a configuration to update one or more PUCCH parameters, e.g., as described in connection with 1702 of FIG. 17 or 1802 of FIG. 18. The update component 1940 may be further configured to receive an indication to update the one or more PUCCH parameters, e.g., as described in connection with 1704 of FIG. 17 or 1804 of FIG. 18. The update component 1940 may be further configured to receive an indication to update the one or more PUCCH parameters, e.g., as described in connection with 1808 of FIG. 18. The communication manager 1932 further includes a selection component 1942 that is configured to select at least one PUCCH parameter of a set of PUCCH parameters, e.g., as described in connection with 1810 of FIG. 18. The communication manager 1932 further includes a communication component 1944 that is configured to communicate based on a PUCCH having the one or more PUCCH parameters updated, e.g., as described in connection with 1706 of FIG. 17 or 1812 of FIG. 18. The communication manager 1932 further includes a report component 1946 that is configured to receive a request for at least one of an aperiodic channel report or a periodic channel report, e.g., as described in connection with 1806 of FIG. 18.

The apparatus may include additional components that perform each of the blocks of the algorithm in the flowcharts of FIGS. 17 and 18. As such, each block in the flowcharts of FIGS. 17 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the cellular baseband processor 1904, includes means for receiving, from a base station, a configuration to update one or more PUCCH parameters. The apparatus includes means for receiving, from the base station, an indication to update the one or more PUCCH parameters based at least on a change of channel conditions. The apparatus includes means for communicating, with the base station, based on a PUCCH having the one or more PUCCH parameters updated. The apparatus further includes means for transmitting, to the base station, a request for updated PUCCH parameters. The apparatus further includes means for receiving, from the base station, a request for at least one of an aperiodic or a periodic channel report. The update of the one or more PUCCH parameters is based on the aperiodic or the periodic channel report transmitted to the base station. The apparatus further includes means for selecting at least one PUCCH parameter of the set of PUCCH parameters within the update. The means may be one or more of the components of the apparatus 1902 configured to perform the functions recited by the means. As described supra, the apparatus 1902 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and configured to transmit, to a UE, a configuration to update one or more PUCCH parameters; identify a change of channel conditions between the UE and the base station; transmit, to the UE, an indication to update the one or more PUCCH parameters based at least on the change of the channel conditions; and communicate, with the UE, based on a PUCCH having the one or more PUCCH parameters updated.

Aspect 2 is the apparatus of aspect 1, further including a transceiver coupled to the at least one processor.

Aspect 3 is the apparatus of any of aspects 1 and 2, further includes that the update of the one or more PUCCH parameters is further based on at least one of a number of bits transmitted by the UE, a coding requirement of the UE, or a channel condition seen by the UE.

Aspect 4 is the apparatus of any of aspects 1-3, further includes that the update of the one or more PUCCH parameters comprises at least one of a signaling capability of a PUCCH format, an encoding of data within the PUCCH, or a type of a PUCCH format.

Aspect 5 is the apparatus of any of aspects 1-4, further includes that the indication is transmitted via DCI or MAC-CE.

Aspect 6 is the apparatus of any of aspects 1-5, further includes that the update of the one or more PUCCH parameters comprises an addition to an existing PUCCH resource.

Aspect 7 is the apparatus of any of aspects 1-6, further includes that the update of the one or more PUCCH parameters comprises a change of at least one field in an existing PUCCH resource.

Aspect 8 is the apparatus of any of aspects 1-7, further includes that the update of the one or more PUCCH parameters comprises a selection of the one or more PUCCH parameters from a set of pre-configured PUCCH parameters.

Aspect 9 is the apparatus of any of aspects 1-8, further includes that the update of the one or more PUCCH parameters comprises a change of sequence parameters for the PUCCH.

Aspect 10 is the apparatus of any of aspects 1-9, further includes that the change of the sequence parameters comprises at least one of a change of a sequence, a change of a sampling function, or a change of a sampling factor, wherein the sampling function is used to select a sequence of a smaller length from an original sequence, and wherein the sampling factor corresponds to a ratio of an original sequence length to a sampled sequence length.

Aspect 11 is the apparatus of any of aspects 1-10, further includes that the update of the one or more PUCCH parameters comprises a change of a mode of encoding information in a PUCCH sequence.

Aspect 12 is the apparatus of any of aspects 1-11, further includes that the update of the one or more PUCCH parameters is for one or more uplink control information of the UE, wherein the uplink control information comprises at least one of a HARQ ACK/NACK, a CSF, or a SR.

Aspect 13 is the apparatus of any of aspects 1-12, further includes that the update of the one or more PUCCH parameters comprises a switch between non-coherent PUCCH and coherent PUCCH.

Aspect 14 is the apparatus of any of aspects 1-13, further includes that the update of PUCCH parameters comprises a change of a PUCCH resource used for transmission of CQI report in uplink by the UE.

Aspect 15 is the apparatus of any of aspects 1-14, further includes that transmission of the indication to update the one or more PUCCH parameters is based on uplink conditions or downlink channel quality reports received from the UE.

Aspect 16 is the apparatus of any of aspects 1-15, further includes that the at least one processor is further configured to receive, from the UE, a request for updated PUCCH parameters; and determine whether to send the updated PUCCH parameters in response to the request.

Aspect 17 is the apparatus of any of aspects 1-16, further includes that the request for the updated PUCCH parameters is transmitted by the UE based at least on at least one of a downlink channel condition, a number of bits for transmission by the UE, or a coding requirement of the UE.

Aspect 18 is the apparatus of any of aspects 1-17, further includes that an update of the one or more PUCCH parameters comprises a preferred type of a PUCCH format.

Aspect 19 is the apparatus of any of aspects 1-18, further includes that the at least one processor is further configured to transmit, to the UE, a request for at least one of an aperiodic or a periodic channel report, wherein an update of the one or more PUCCH parameters is based on the channel report received from the UE.

Aspect 20 is the apparatus of any of aspects 1-19, further includes that the at least one processor is further configured to monitor for one or more uplink transmissions based on the updated PUCCH parameters, wherein an update of the one or more PUCCH parameters comprises a set of PUCCH parameters for selection by the UE.

Aspect 21 is the apparatus of any of aspects 1-20, further includes that the at least one processor is further configured to allocate one or more PUCCH parameters for selection by the UE; and monitor for one or more uplink transmissions based on the one or more PUCCH parameters allocated for selection by the UE.

Aspect 22 is a method of wireless communication for implementing any of aspects 1-21.

Aspect 23 is an apparatus for wireless communication including means for implementing any of aspects 1-21.

Aspect 24 is a computer-readable medium storing computer executable code, where the code when executed by a processor causes the processor to implement any of aspects 1-21.

Aspect 25 is an apparatus for wireless communication at a UE including at least one processor coupled to a memory and configured to receive, from a base station, a configuration to update one or more PUCCH parameters; receive, from the base station, an indication to update the one or more PUCCH parameters based at least on a change of channel conditions; and communicate, with the base station, based on a PUCCH having the one or more PUCCH parameters updated.

Aspect 26 is the apparatus of aspect 25, further including a transceiver coupled to the at least one processor.

Aspect 27 is the apparatus of any of aspects 25 and 26, further includes that the at least one processor is further configured to transmit, to the base station, a request for updated PUCCH parameters.

Aspect 28 is the apparatus of any of aspects 25-27, further includes that the request for the updated PUCCH parameters is transmitted based at least on at least one of a downlink channel condition, a number of bits for transmission by the UE, or a coding requirement of the UE.

Aspect 29 is the apparatus of any of aspects 25-28, further includes that the at least one processor is further configured to receive, from the base station, a request for a channel report, wherein the update of the one or more PUCCH parameters is based on the channel report transmitted to the base station.

Aspect 30 is the apparatus of any of aspects 25-29, further includes that the update of the one or more PUCCH parameters comprises a set of PUCCH parameters, further includes that the at least one processor is further configured to select at least one PUCCH parameter of the set of PUCCH parameters within the update.

Aspect 31 is a method of wireless communication for implementing any of aspects 25-30.

Aspect 32 is an apparatus for wireless communication including means for implementing any of aspects 25-30.

Aspect 33 is a computer-readable medium storing computer executable code, where the code when executed by a processor causes the processor to implement any of aspects 25-30.

What is claimed is:

1. An apparatus for wireless communication at a base station, comprising:
    memory; and
    at least one processor coupled to the memory and configured to:
        transmit, to a user equipment (UE), a configuration to update one or more physical uplink control channel (PUCCH) parameters;
        receive, from the UE, a request for an update of the one or more PUCCH parameters, wherein the request for the update of the one or more PUCCH is based at least on at least one of a downlink channel condition, a number of bits for transmission by the UE, or a coding requirement of the UE:
        transmit, to the UE, an indication to update the one or more PUCCH parameters based at least on the request; and
        communicate, with the UE, based on a PUCCH having the one or more PUCCH parameters updated.

2. The apparatus of claim 1, further comprising a transceiver coupled to the at least one processor.

3. The apparatus of claim 1, wherein the update of the one or more PUCCH parameters is further based on at least one of a number of bits transmitted by the UE, a coding requirement of the UE, or a channel condition seen by the UE.

4. The apparatus of claim 1, wherein the update of the one or more PUCCH parameters comprises at least one of a signaling capability of a PUCCH format, an encoding of data within the PUCCH, or a type of a PUCCH format.

5. The apparatus of claim 1, wherein to transmit the indication, the at least one processor is configured to transmit the indication via downlink control information (DCI) or media access control (MAC) control element (CE) (MAC-CE).

6. The apparatus of claim 1, wherein the update of the one or more PUCCH parameters comprises an addition to an existing PUCCH resource.

7. The apparatus of claim 1, wherein the update of the one or more PUCCH parameters comprises a change of at least one field in an existing PUCCH resource.

8. The apparatus of claim 1, wherein the update of the one or more PUCCH parameters comprises a selection of the one or more PUCCH parameters from a set of pre-configured PUCCH parameters.

9. The apparatus of claim 1, wherein the update of the one or more PUCCH parameters comprises a change of sequence parameters for the PUCCH.

10. The apparatus of claim 9, wherein the change of the sequence parameters comprises at least one of a change of a sequence, a change of a sampling function, or a change of a sampling factor, wherein the sampling function is used to select a sequence of a smaller length from an original sequence, and wherein the sampling factor corresponds to a ratio of an original sequence length to a sampled sequence length.

11. The apparatus of claim 1, wherein the update of the one or more PUCCH parameters comprises a change of a mode of encoding information in a PUCCH sequence.

12. The apparatus of claim 1, wherein the update of the one or more PUCCH parameters is for one or more uplink control information of the UE, wherein the uplink control information comprises at least one of a hybrid automatic repeat request (HARQ) acknowledgment (ACK)/negative ACK (NACK), a channel state feedback (CSF), or a scheduling request (SR).

13. The apparatus of claim 1, wherein the update of the one or more PUCCH parameters comprises a switch between non-coherent PUCCH and coherent PUCCH.

14. The apparatus of claim 1, wherein the update of PUCCH parameters comprises a change of a PUCCH resource used for transmission of channel quality indicator (CQI) report in uplink by the UE.

15. The apparatus of claim 1, wherein transmission of the indication to update the one or more PUCCH parameters is based on uplink conditions or downlink channel quality reports received from the UE.

16. The apparatus of claim 1, wherein the at least one processor is further configured to:
determine to send the indication to update the one or more PUCCH parameters in response to the request.

17. The apparatus of claim 16, wherein an update of the one or more PUCCH parameters comprises a preferred type of a PUCCH format.

18. The apparatus of claim 16, wherein the at least one processor is further configured to:
transmit, to the UE, a request for at least one of an aperiodic or a periodic channel report, wherein an update of the one or more PUCCH parameters is based on the channel report received from the UE.

19. The apparatus of claim 16, wherein the at least one processor is further configured to:
monitor for one or more uplink transmissions based on the updated PUCCH parameters, wherein an update of the one or more PUCCH parameters comprises a set of PUCCH parameters for selection by the UE.

20. The apparatus of claim 1, wherein the at least one processor is further configured to:
allocate one or more PUCCH parameters for selection by the UE; and
monitor for one or more uplink transmissions based on the one or more PUCCH parameters allocated for selection by the UE.

21. A method of wireless communication at a base station, comprising:
transmitting, to a user equipment (UE), a configuration to update one or more physical uplink control channel (PUCCH) parameters;
receiving, from the UE, a request for an update of the one or more PUCCH parameters, wherein the request for the update of the one or more PUCCH is based at least on at least one of a downlink channel condition, a number of bits for transmission by the UE, or a coding requirement of the UE:
transmitting, to the UE, an indication to update the one or more PUCCH parameters based at least on the request; and
communicating, with the UE, based on a PUCCH having the one or more PUCCH parameters updated.

22. The method of claim 21, further comprising:
receiving, from the UE, a request for updated PUCCH parameters; and
determining to send the updated PUCCH parameters in response to the request.

23. An apparatus for wireless communication at a user equipment (UE), comprising:
memory; and
at least one processor coupled to the memory and configured to:
receive, from a base station, a configuration to update one or more physical uplink control channel (PUCCH) parameters;
transmit, to the base station, a request for an update of the one or more PUCCH parameters, wherein the request for the update of the one or more PUCCH is based at least on at least one of a downlink channel condition, a number of bits for transmission by the UE, or a coding requirement of the UE:
receive, from the base station, an indication to update the one or more PUCCH parameters based at least on the request; and
communicate, with the base station, based on a PUCCH having the one or more PUCCH parameters updated.

24. The apparatus of claim 23, further comprising a transceiver coupled to the at least one processor.

25. The apparatus of claim 23, wherein the at least one processor is further configured to:
receive, from the base station, a request for a channel report, wherein the update of the one or more PUCCH parameters is based on the channel report transmitted to the base station.

26. The apparatus of claim 23, wherein the update of the one or more PUCCH parameters comprises a set of PUCCH parameters, wherein the at least one processor is further configured to:
select at least one PUCCH parameter of the set of PUCCH parameters within the update.

27. A method of wireless communication at a user equipment (UE), comprising:
receiving, from a base station, a configuration to update one or more physical uplink control channel (PUCCH) parameters;
transmitting, to the base station, a request for an update of the one or more PUCCH parameters, wherein the request for the update of the one or more PUCCH is based at least on at least one of a downlink channel condition, a number of bits for transmission by the UE, or a coding requirement of the UE:
receiving, from the base station, an indication to update the one or more PUCCH parameters based at least on the request; and
communicating, with the base station, based on a PUCCH having the one or more PUCCH parameters updated.

* * * * *